US009536161B1

(12) United States Patent
Lish et al.

(10) Patent No.: US 9,536,161 B1
(45) Date of Patent: Jan. 3, 2017

(54) VISUAL AND AUDIO RECOGNITION FOR SCENE CHANGE EVENTS

(71) Applicant: Amazon Technologies, Inc., Reno, NV (US)

(72) Inventors: Christopher John Lish, Seattle, WA (US); Oleg Rybakov, Seattle, WA (US); Sonjeev Jahagirdar, Somerville, MA (US); Junxiong Jia, Mercer Island, WA (US); Neil David Cooper, Redmond, WA (US); Avnish Sikka, Acton, MA (US)

(73) Assignee: Amazon Technologies, Inc., Reno, NV (US)

( * ) Notice: Subject to any disclaimer, the term of this patent is extended or adjusted under 35 U.S.C. 154(b) by 11 days.

(21) Appl. No.: 14/307,090

(22) Filed: Jun. 17, 2014

(51) Int. Cl.
G06K 9/20 (2006.01)
H04N 5/232 (2006.01)
G06K 9/32 (2006.01)

(52) U.S. Cl.
CPC ........... *G06K 9/2054* (2013.01); *G06K 9/3241* (2013.01); *H04N 5/23241* (2013.01); *H04N 5/23245* (2013.01)

(58) Field of Classification Search
CPC H04N 9/8082; H04N 19/00284; H04N 7/188; G06T 7/0075; G06T 7/0042; G06T 2207/10012; G06K 9/4671; G06K 9/00208; G06K 9/00771; G08B 13/19682; G08B 13/19695; G08B 13/19669

(Continued)

(56) References Cited

U.S. PATENT DOCUMENTS 3,001,439 A  9/1961 Rouy
4,876,457 A  10/1989 Bose
(Continued)

FOREIGN PATENT DOCUMENTS

CN  101010693  8/2007
CN  101231662  7/2008
(Continued)

OTHER PUBLICATIONS

PCT International Search Report and Written Opinion dated Jan. 31, 2014, for International Application No. PCT/US2013/044182, 15 pages.

(Continued)

*Primary Examiner* — Pritham Prabhakher
(74) *Attorney, Agent, or Firm* — Polsinelli LLP

(57) ABSTRACT

Various embodiments describe systems and methods for utilizing a reduced amount of processing capacity for incoming data over time, and, in response to detecting a scene-change-event, notify one or more data processors that a scene-change-event has occurred, and cause incoming data to be processed as new data. In some embodiments, an incoming frame can be compared with a reference frame to determine a difference between the reference frame and the incoming frame. The reference frame may be correlated to a latest scene-change-event. In response to a determination that the difference does not meet one or more difference criteria, a user interface or at least one processor of the computing device can be notified to reduce processing of incoming data over time. In response to a determination that the difference meets the one or more difference criteria, the user interface or the at least one processor can be notified that a scene-change-event has occurred. Incoming data to the computing device is then treated as new and processed as those under an active condition. The current incoming frame can be selected as a new reference frame for detecting next scene-change-event.

21 Claims, 15 Drawing Sheets

(58) Field of Classification Search
USPC .................................................... 348/222.1
See application file for complete search history.

(56) References Cited

U.S. PATENT DOCUMENTS

| | | | |
|---|---|---|---|
| 5,611,000 A | 3/1997 | Szeliski et al. | |
| 5,694,491 A | 12/1997 | Brill et al. | |
| 5,717,781 A | 2/1998 | Ebel et al. | |
| 5,754,978 A | 5/1998 | Perez-Mendez et al. | |
| 5,784,500 A | 7/1998 | Homma et al. | |
| 5,855,000 A | 12/1998 | Waibel et al. | |
| 5,974,159 A | 10/1999 | Lubin et al. | |
| 5,983,218 A | 11/1999 | Syeda-Mahmood | |
| 6,075,905 A | 6/2000 | Herman et al. | |
| 6,307,959 B1 | 10/2001 | Mandelbaum et al. | |
| 6,446,060 B1 | 9/2002 | Bergman et al. | |
| 6,473,459 B1* | 10/2002 | Sugano | H04N 19/142 375/240.16 |
| 6,580,811 B2 | 6/2003 | Maurer et al. | |
| 6,731,788 B1 | 5/2004 | Agnihotri et al. | |
| 6,941,016 B1 | 9/2005 | Wagman et al. | |
| 7,003,161 B2 | 2/2006 | Tessadro | |
| 7,072,872 B2 | 7/2006 | Caid et al. | |
| 7,109,987 B2 | 9/2006 | Goel et al. | |
| 7,137,072 B2 | 11/2006 | Bauer et al. | |
| 7,206,437 B2 | 4/2007 | Kramer et al. | |
| 7,209,601 B2* | 4/2007 | Manabe | H04N 5/23248 348/294 |
| 7,240,062 B2 | 7/2007 | Anderson et al. | |
| 7,251,637 B1 | 7/2007 | Caid et al. | |
| 7,587,308 B2 | 9/2009 | Kasravi et al. | |
| 7,894,689 B2 | 2/2011 | Liu et al. | |
| 7,996,571 B2 | 8/2011 | Salokannel | |
| 8,037,043 B2 | 10/2011 | Zoeter et al. | |
| 8,126,247 B2 | 2/2012 | Chiang et al. | |
| 8,126,272 B2 | 2/2012 | Carr et al. | |
| 8,184,155 B2 | 5/2012 | Ke et al. | |
| 8,214,387 B2 | 7/2012 | King et al. | |
| 8,249,347 B1 | 8/2012 | Ramkumar et al. | |
| 8,290,215 B2 | 10/2012 | Nielsen et al. | |
| 8,406,507 B2 | 3/2013 | Ruzon et al. | |
| 8,582,727 B2 | 11/2013 | Saylor et al. | |
| 8,606,011 B1 | 12/2013 | Ivanchenko et al. | |
| 8,644,610 B1 | 2/2014 | Ramkumar et al. | |
| 8,654,934 B2 | 2/2014 | Saylor et al. | |
| 8,818,095 B2 | 8/2014 | Du | |
| 8,930,134 B2 | 1/2015 | Gu et al. | |
| 9,055,384 B2 | 6/2015 | Ivanchenko et al. | |
| 9,071,814 B1* | 6/2015 | Fan | H04N 19/177 |
| 9,256,795 B1 | 2/2016 | Gray et al. | |
| 9,342,930 B1 | 5/2016 | Kraft et al. | |
| 2002/0051575 A1 | 5/2002 | Myers et al. | |
| 2002/0168009 A1* | 11/2002 | Sakaguchi | H04N 19/51 375/240.16 |
| 2002/0181745 A1 | 12/2002 | Hu | |
| 2003/0225686 A1 | 12/2003 | Mollett et al. | |
| 2004/0088291 A1 | 5/2004 | Furuhashi et al. | |
| 2005/0002571 A1 | 1/2005 | Hiraga et al. | |
| 2005/0060273 A1 | 3/2005 | Andersen et al. | |
| 2005/0180632 A1 | 8/2005 | Aradhye et al. | |
| 2005/0229200 A1 | 10/2005 | Kirkland et al. | |
| 2005/0248660 A1* | 11/2005 | Stavely | G03B 39/00 348/208.16 |
| 2005/0271304 A1 | 12/2005 | Retierath et al. | |
| 2006/0013450 A1 | 1/2006 | Shan et al. | |
| 2006/0045348 A1 | 3/2006 | Kiros et al. | |
| 2006/0120629 A1 | 6/2006 | Myers et al. | |
| 2006/0181613 A1* | 8/2006 | Cazier | H04N 5/23225 348/207.99 |
| 2006/0262976 A1 | 11/2006 | Hart et al. | |
| 2007/0047767 A1 | 3/2007 | Watabe | |
| 2007/0172117 A1 | 7/2007 | Wong | |
| 2007/0233579 A1 | 10/2007 | Saarinen et al. | |
| 2007/0260639 A1 | 11/2007 | Tobin et al. | |
| 2007/0296821 A1* | 12/2007 | Kakkori | G03B 7/00 348/208.6 |
| 2008/0060034 A1 | 3/2008 | Egnal et al. | |
| 2008/0095448 A1 | 4/2008 | Ono et al. | |
| 2008/0101726 A1 | 5/2008 | Myers et al. | |
| 2008/0118146 A1 | 5/2008 | Cieplinski | |
| 2008/0144943 A1 | 6/2008 | Gokturk et al. | |
| 2008/0167834 A1 | 7/2008 | Herz et al. | |
| 2008/0240618 A1 | 10/2008 | Chen et al. | |
| 2008/0273807 A1 | 11/2008 | Dauw et al. | |
| 2008/0298718 A1 | 12/2008 | Liu et al. | |
| 2008/0304753 A1 | 12/2008 | Sohma et al. | |
| 2009/0070110 A1 | 3/2009 | Erol et al. | |
| 2009/0070415 A1 | 3/2009 | Kishi et al. | |
| 2009/0074300 A1 | 3/2009 | Hull et al. | |
| 2009/0100050 A1 | 4/2009 | Erol et al. | |
| 2009/0125510 A1 | 5/2009 | Graham et al. | |
| 2009/0254543 A1 | 10/2009 | Ber et al. | |
| 2010/0007601 A1 | 1/2010 | Lashina et al. | |
| 2010/0042523 A1 | 2/2010 | Henry et al. | |
| 2010/0166309 A1 | 7/2010 | Hull et al. | |
| 2010/0166339 A1 | 7/2010 | Gokturk et al. | |
| 2010/0329574 A1 | 12/2010 | Moraleda et al. | |
| 2011/0035662 A1 | 2/2011 | King et al. | |
| 2011/0222768 A1 | 9/2011 | Galic et al. | |
| 2011/0234825 A1* | 9/2011 | Liu | H04N 5/23248 348/208.5 |
| 2011/0286627 A1 | 11/2011 | Takacs et al. | |
| 2012/0005046 A1 | 1/2012 | Wu et al. | |
| 2012/0019557 A1 | 1/2012 | Aronsson et al. | |
| 2012/0063686 A1 | 3/2012 | Dauw et al. | |
| 2012/0072110 A1 | 3/2012 | Venkatraman | |
| 2012/0092329 A1 | 4/2012 | Koo et al. | |
| 2012/0114249 A1 | 5/2012 | Conwell | |
| 2012/0170852 A1 | 7/2012 | Zhang et al. | |
| 2012/0190385 A1 | 7/2012 | Nair et al. | |
| 2012/0242842 A1 | 9/2012 | Yoshigahara et al. | |
| 2012/0245835 A1 | 9/2012 | Weitz et al. | |
| 2012/0310643 A1 | 12/2012 | Labsky et al. | |
| 2013/0045751 A1 | 2/2013 | Chao et al. | |
| 2013/0054576 A1 | 2/2013 | Karmarkar et al. | |
| 2013/0218886 A1 | 8/2013 | Graham et al. | |
| 2013/0231852 A1 | 9/2013 | Weitz et al. | |
| 2013/0314441 A1* | 11/2013 | Grasset | G06T 1/00 345/633 |
| 2013/0322754 A1 | 12/2013 | Lee et al. | |
| 2013/0330003 A1 | 12/2013 | Ivanchenko et al. | |
| 2013/0346431 A1 | 12/2013 | Erol et al. | |
| 2014/0100997 A1 | 4/2014 | Mayerle et al. | |
| 2015/0002665 A1* | 1/2015 | Sentinelli | G06K 9/00771 348/143 |
| 2015/0043771 A1* | 2/2015 | Wu | G06K 9/00785 382/103 |
| 2015/0161715 A1 | 6/2015 | Rose | |
| 2015/0170418 A1 | 6/2015 | Flynn et al. | |
| 2015/0294479 A1* | 10/2015 | Kovacevic | G06T 7/20 382/103 |

FOREIGN PATENT DOCUMENTS

| | | |
|---|---|---|
| JP | S61-141087 | 6/1986 |
| JP | H03-192476 | 8/1991 |
| JP | H09-6957 | 1/1997 |
| JP | H11-25221 | 1/1999 |
| JP | 2004-240692 | 8/2004 |
| JP | 2006-331117 | 12/2006 |
| JP | 2008-217833 | 9/2008 |
| JP | 2010-244211 | 10/2010 |
| JP | 2013-042415 | 2/2013 |
| WO | 2013/184726 | 12/2013 |

OTHER PUBLICATIONS

USPTO Final Office Action dated Oct. 22, 2014, for U.S. Appl. No. 14/046,814, 7 pages.
USPTO Non-Final Office Action dated Apr. 10, 2014, for U.S. Appl. No. 14/046,814, 5 pages.

(56) References Cited

OTHER PUBLICATIONS

CN Second Office Action mailed Aug. 28, 2013; in corresponding Chinese Patent No. 201080008793.1.
USPTO Notice of Allowance mailed Jul. 29, 2013; in corresponding U.S. Appl. No. 13/491,398.
USPTO Notice of Allowance and Fee(s) Due mailed Feb. 4, 2014; in corresponding U.S. Appl. No. 13/429,135.
USPTO Non-Final Office Action mailed Mar. 12, 2014; in corresponding U.S. Appl. No. 13/688,772.
USPTO Notice of Allowance and Fee(s) Due mailed Feb. 5, 2014; in corresponding U.S. Appl. No. 12/378,599.
EP Search Report dated Jun. 6, 2013, Europe Patent Application No. 10744249.3, Jun. 6, 2013, 5 pages.
USPTO Final Office Action dated Jan. 30, 2012, U.S. Appl. No. 12/378,599, 15 pages.
JP Final Office Action dated May 14, 2013, Japanese Application No. 2011-551189, 1 page.
CN First Office Action dated Feb. 1, 2013, Chinese Patent Application No. 201080008793.1, 25 pages.
PCT International Search Report dated Mar. 2, 2010, International Application No. PCT/US2010/020943, 14 pages.
PCT International Search Report dated Mar. 30, 2010, International Application No. PCT/US2010/024466, Mar. 30, 2013, 2 pages.
PCT International Search Report dated Mar. 5, 2010, International Application No. PCT/US2010/021206, Mar. 5, 2010, 2 pages.
PCT International Written Opinion dated Mar. 30, 2013, International Application No. PCT/US2010/024466, Mar. 30, 2013, 2 pages.
JP Non Final Office Action dated Jan. 8, 2013, Japanese Application No. 2011-551189, Jan. 8, 2013,2 pages.
USPTO Non Final Office Action dated Apr. 17, 2012, U.S. Appl. No. 12/321,235, 6 pages.
USPTO Non Final Office Action dated May 7, 2012, U.S. Appl. No. 12/319,992, 19 pages.
USPTO Non Final Office Action dated Jun. 24, 2011, U.S. Appl. No. 12/378,599, 10 pages.
USPTO Non Final Office Action dated Jun. 6, 2012, U.S. Appl. No. 12/321,235, 29 pages.
USPTO Notice of Allowance dated Oct. 26, 2012, U.S. Appl. No. 12/319,992, 7 pages.
USPTO Notice of Allowance dated Nov. 29, 2012, U.S. Appl. No. 12/321,235, filed Nov. 29, 2012, 14 pages.
Baatz, Georges et al., "Handling Urban Location Recognition as a 2D Homothetic Problem", http://www.inf.ethz.ch/personal/pomarc/pubs/BaatzECCV1O.pdf, 14 pages.
Baumberg, Adam, "Reliable Feature Matching Across Widely Separated Views", Proceedings of Computer Vision and Pattern Recognition, vol. 1, 2000, pp. 1774-1781.
Berretti, Stefano et al., "Merging Results for Distributed Content Based Image Retrieval", Multimedia Tools and Applications, Kluwer Academic Publishers, vol. 24; No. 3, Dec. 1, 2004, pp. 215-232.
Chen, David M. et al., "City-Scale Landmark Identification on Mobile Devices", http://www.inf.ethz.ch/personal/gbaatz/papers/chen11.pdf, 8 pages.

Cheng, Liang et al., "Robust Affine Invariant Feature Extraction for Image Matching", IEEE Geoscience and Remote Sensing Letters, vol. 5, No. 2, 2008, 5 pages.
Chu et al., "Image-guided tours: Fast-approximated sift with u-surf features", Technical report, Stanford University, Department of Electrical Engineering, 2007.
Fischler, Martin A. et al., "Random Sample Consensus: A Paradigm for Model Fitting with Applications to Image Analysis and Automated Cartography", Communications of the ACM, vol. 24, 1981, pp. 381-395.
Jia et al., "Photo-to-Search: Using Camera Phones to Inquire of the Surrounding World", Proceedings of the 7th International Conference on Mobile Data Management (MOM '06), 2006.
Labe, T. et al., "Automatic Relative Orientation of Images", Proceedings of the Fifth Turkish-German Joint Geodetic Days, Berlin, Germany, 2006, 6 pages.
Lowe, David G., "Distinctive Image Features from Scale-Invariant Keypoints", Jan. 5, 2004, 28 pages.
Lowe, David G., "Distinctive Image Features from Scale-Invariant Keypoints", International Journal of Computer Vision, 2004, pp. 91-110.
Paiva, "Topological Equivalence and Similarity in Multi-Representation Geographic Databases", The University of Maine-Electronic Theses and Dissertations, 1998.
Philbin, James et al., "Object Retrieval with Large Vocabularies and Fast Spatial Matching", Proceedings of Computer Vision and Pattern Recognition, 2007, 9 pages.
Schmid, Cordelia et al., "Local Grayvalue Invariants for Image Retrieval", IEEE Transactions on Pattern Analysis and Machine Intelligence, vol. 19, May 5, 1997, pp. 530-535.
Wang, Yizhou et al., "Object Recognition Using Multi-View Imaging", Signal Processing, ICSP 2008, Ninth International Conference on IEEE, Piscataway, New Jersey, Oct. 26, 2008, pp. 810-813.
Winder, Simon A. et al., "Learning Local Image Descriptors", Proceedings of Computer Vision and Pattern Recognition, 2007, 8 pages.
Zheng, Yu et al., "Distributed Architecture for Large Scale Image-Based Search", Multimedia and Expo, 2007 IEEE International Conference, Jul. 1, 2007, pp. 579-582.
PCT International Preliminary Report on Patentability dated Dec. 9, 2014, for International Application No. PCT/US2013/044182, 5 pages.
Cheriet, Mohamed, et al., "Character Recognition Systems: A Guide for Students and Practitioners," Jan. 1, 2007, 53 pages, Wiley, Hoboekn, NJ, USA.
Mori, Shunji, et al., "Chapter 4, Thresholding Selection", Optical Character Recognition, Jan. 1, 1999, pp. 105-109, John Wiley & Sons, NY, USA.
Takahashi, Yasuko, et al., "Morphology Based Thresholding for Character Extraction," 2334D IEICE Transactions on Information and Systems, revised May 20, 1993, E76-D Oct. 1993, No. 10, Tokyo, JP.
Extended European Search Report for EP Patent Application No. 13800534.3 dated Mar. 21, 2016, 6 pages.

* cited by examiner

VISUAL AND AUDIO RECOGNITION FOR SCENE CHANGE EVENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Portable computing devices are becoming increasingly powerful and affordable. Many applications for these computing devices can be used to identify certain types of text and/or visual objects in videos and images as the videos and images are being captured by, or streamed onto, the computing devices. However, data processing of video and/or audio data may take substantial processing capacity and power on the computing devices. Also, the increasingly thinner and smaller designs of portable computing devices may limit the sizes and capacities of the batteries and processors that can be used in these devices. With more applications and features running on mobile devices, processing speed and battery lifetime can be increasingly important for an acceptable user experience. Therefore, there is a need to preserve processing power and battery on a computing device for tasks such as video and/or audio recognition processes.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
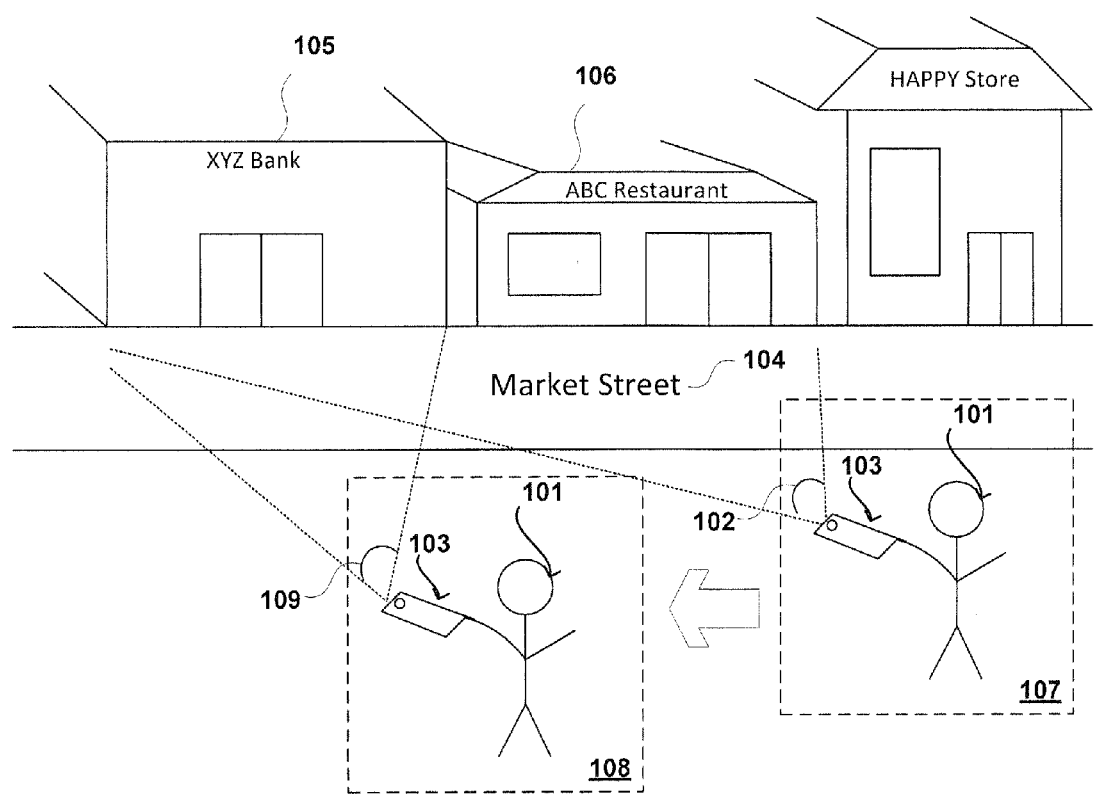
FIG. 1A illustrates an example of a scene in the real world in accordance with various embodiments.

Systems and methods in accordance with various embodiments of the present disclosure overcome deficiencies in conventional approaches in image, video, and/or audio data processing on a computing device. In particular, various embodiments enable a computing device to utilize a reduced amount of processing capacity for incoming data over time, and, in response to detecting a scene-change-event, notify one or more data processors that a scene-change-event has occurred, and cause incoming data to be processed as new data. In some embodiments, an incoming frame can be compared with a reference frame to determine a difference between the reference frame and the incoming frame. The reference frame may be correlated to a latest scene-change-event. In response to a determination that the difference does not meet one or more difference criteria, a user interface or at least one processor of the computing device can be notified to reduce processing of incoming data over time. In response to a determination that the difference meets the one or more difference criteria, the user interface or the at least one processor can be notified that a scene-change-event has occurred. Incoming data to the computing device is then treated as new and processed as those under an active condition. The current incoming frame can be selected as a new reference frame for detecting next scene-change-event.

In some embodiments, a notification of a scene-change-event sent to a user interface or at least one data processor of the computing device may be based upon information such as the types of text, features or objects represented in the current incoming frame. For example, compared with the reference frame (e.g., a book cover), the current incoming frame may have changed to include a representation of a product. The notification of the scene-change event may include the context of the product to allow the at least one data processor of the computing device to treat text corresponding to the representation of the product differently from text corresponding to the representation of the book cover. In some embodiments, in response to detecting a scene-change-event, one or more different data processors may be activated to process the current incoming frame based at least upon the context of the current incoming frame. In some embodiments, ongoing processing data may be at least partly purged or reset based upon previously processed frames, the current incoming frame, or audio data of the computing device.

At least some embodiments determine differences between a reference frame and an incoming frame based at least upon features or objects in the frames, audio data, or lighting changes between the frames. In some embodiments, a difference between a reference frame and an incoming frame can be determined using one or more homography algorithms. For example, a difference between the reference frame and the incoming frame can be measured as a percentage of the length of sides of one frame with respect to another frame. If the difference at least meets one or more criteria (e.g., a predefined percentage in length) whether horizontally, vertically or both, then a scene-change-event is determined to have been detected. In some embodiments, a difference could be measured based upon a percentage of features in the reference frame that are no longer present in an incoming frame. In some instances, the computing device may move rapidly and as a result not try to identify any scene. Some embodiments may skip processing incoming frames until the computing device is determined to stabilize on a scene for at least a predefined period of time. In some embodiments, downsampled image frames may be used in tracking a difference between frames to achieve computational efficiency.

In some embodiments, if a difference between the reference frame and an incoming frame cannot be calculated using a homography algorithm, it can be assumed that a scene-change-event has occurred. Incoming data then can be treated as new and processed under an active condition. The current incoming frame can be selected as a new reference frame for future comparison between frames.

Some embodiments analyze texts, features, and/or objects in a reference frame to determine a set of candidate tracking points. A confidence score can be calculated for each of the candidate tracking points. In some embodiments, a tracking point may include a portion of regions surrounding the corresponding text, feature or object in the reference frame. One or more tracking points with the highest confidence score may be selected to be used to compare with incoming frames. A net motion between the reference frame and an incoming frame can be determined by tracking the one or more selected tracking points. When the net motion of the one or more tracking points is equal to or above the motion threshold, the user interface can be notified that a scene change event has occurred.

At least some embodiments perform a sound identification to determine an audio reference (e.g., a song or ambient sound signal) for a computing device. Incoming audio data is compared with the audio reference to determine an audio change between the incoming audio data and the audio reference. In response to the audio change being below an audio threshold, a user interface or one or more processors of the computing device can be notified to reduce processing incoming data over time. In response to the audio change being above the audio threshold, the user interface can be notified that a scene change event has occurred. Incoming data can be processed and treated as new data under an active condition. The audio reference is then reset to the incoming audio signal.

Some embodiments analyze diatonic and chromatic scales, frequency, harmony of an incoming audio data to determine an audio reference. In some instances, a particular song or music may be determined and identified as an audio reference. In some embodiments, frequency, harmony, diatonic and/or chromatic signature or progression of popular songs and music may be analyzed offline and provided to the computing device in the process of identifying an audio reference. In some embodiments, audio changes between an incoming audio data and an audio reference can be determined by analyzing frequency, pattern, and/or volume differences between the incoming audio data and the audio reference.

In some embodiments, one or more orientation, surrounding, and/or position determining sensors on a computing device may be used to track motion and/or surroundings of the computing device. A scene-change event can be determined based at least upon the changes in the motion or surroundings of the computing device (e.g., movement, and/or ambient audio or light of the computing device). For example, when a computing device is moving, the computing device may be configured to inspect accelerometer data in the previous fixed amount of time (e.g., 5 seconds) and determine whether the computing device is stabilized before comparing an incoming frame with the reference frame. In some embodiments, a substantial change in motion and/or surroundings of the computing device may indicate that a scene-change event has occurred. For example, a rapid moving computing device, a substantial scale change in a scene, or a substantial change in ambient light and/or surrounding sound may trigger a scene-change-event notification. The one or more sensors may include at least one of accelerometers, inertial sensors, magnetometers, electronic gyroscopes, ambient light sensors, proximity sensors, or electronic compasses. Some embodiments track motion of a computing device by analyzing network connection data. For example, a computing device may be connected to a network via a cellular, Wi-Fi, Bluetooth, or near field communication (NFC)) connection. Network connection data (e.g., variations in network signal strength, or handoff from one network to another network) may be used to determine motions of the computing device.

FIG. 1A illustrates an example of a scene in the real world in accordance with various embodiments. In this example, a user 101 with a computing device 103 can be seen moving through the Market Street 104. Although the computing device 103 is shown as a mobile phone in FIG. 1A, it should be understood that various types of electronic or computing device that are capable of capturing and/or processing images in accordance with various embodiments are discussed herein. These computing devices can include, for example digital cameras, desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of processing data, or a combination of any two or more of these. The computing device may use operating systems that include, but are not limited to, Android, Berkeley Software Distribution (BSD), iPhone OS (iOS), Linus, OS X, Unix-like Real-time Operating System (e.g., QNX), Microsoft Windows, Window Phone, and IBM z/OS. The computing device 103 may have one or more image capture elements, such as one or more cameras or camera sensors, to capture images and/or videos. The one or more image capture elements may include a charge-coupled device (CCD), an active pixel sensor in complementary metal-oxide-semiconductor (CMOS) or N-type metal-oxide-semiconductor (NMOS), an infrared or ultrasonic image sensor, or an image sensor utilizing other type of image capturing technologies. The computing device 103 may have one or more audio capture devices capable of capturing audio data (e.g., ambient sound, a song, or word commands from a user).

Figure 1B:
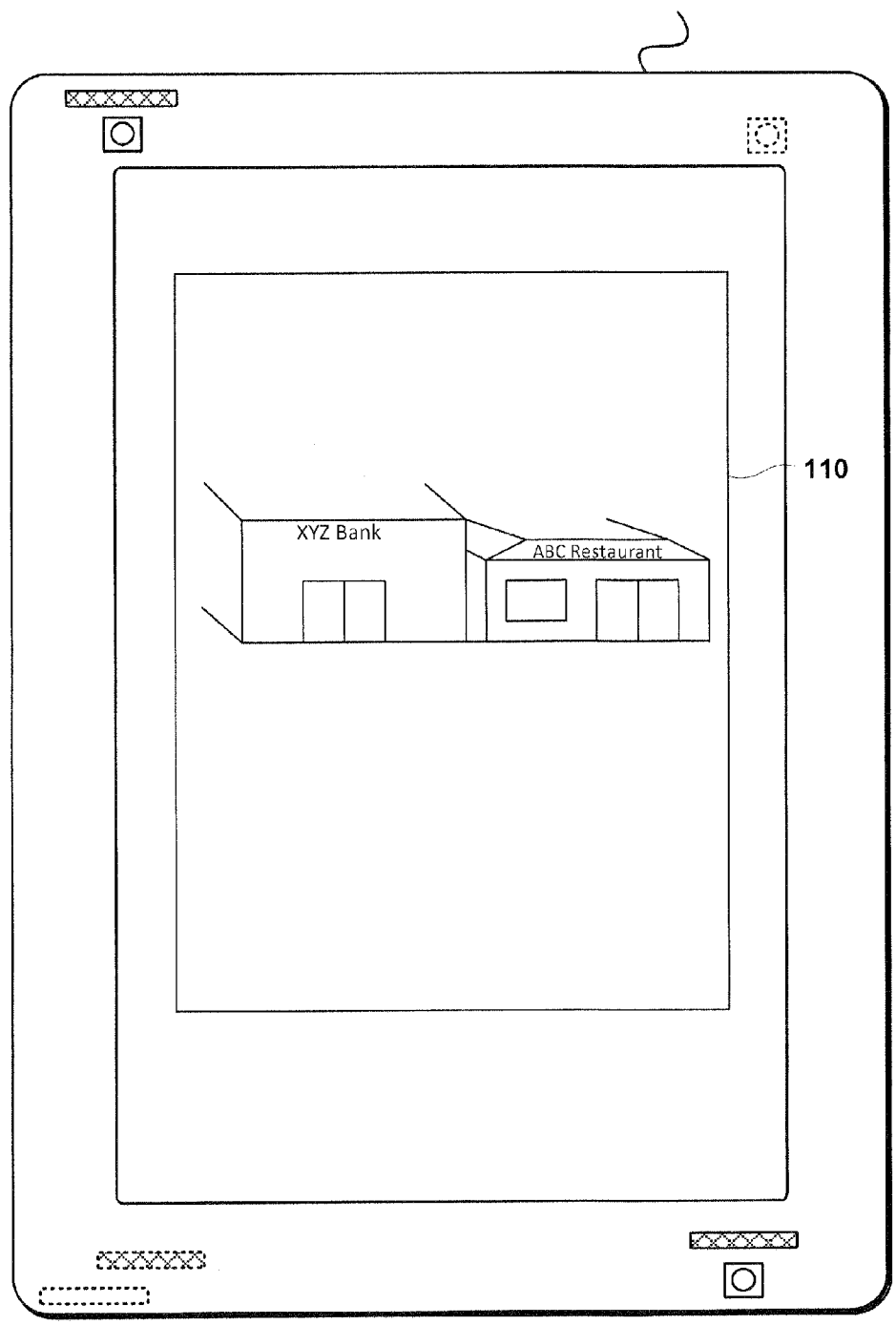
FIGS. 1B and 1C illustrate examples of image frames in accordance with various embodiments.
Figure 1C:
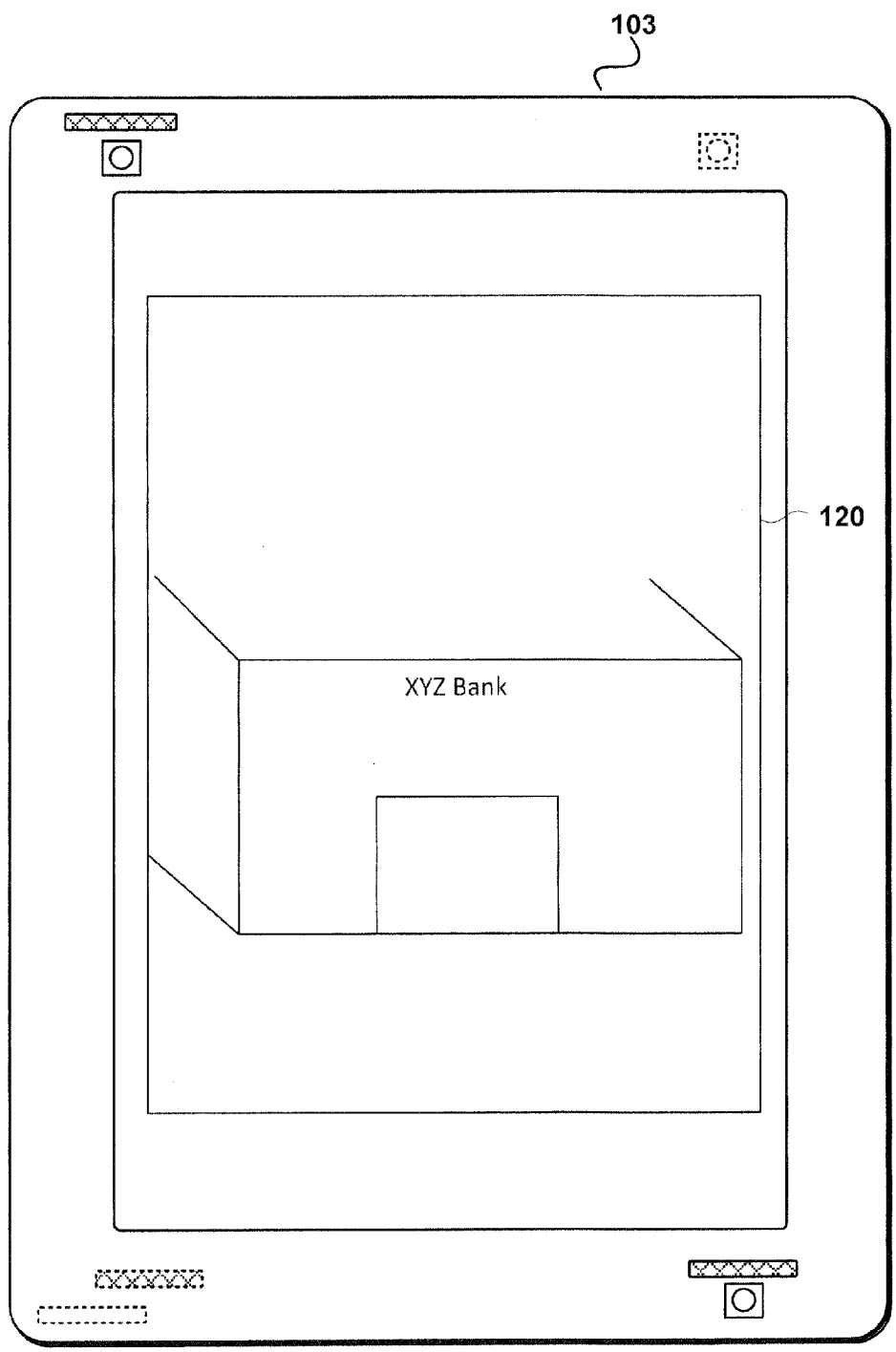

In this example, the user 101 may aim one or more image capture elements located on the computing device 103 to capture images or a video of at least a portion of the XYC Bank 105 and the ABC Restaurant 106 as the user 101 is walking from a position 107 to a position 108. At the position 107, the computing device 103 has a viewing angle 102 that is able to capture an image of at least a substantial portion of the ABC Restaurant 106 and the XYZ Bank 105 such that the ABC Restaurant 106 and the XYZ Bank 105 are in the center of the viewing angle 102. At the position 108, the computing device 103 has a viewing angle 109 that is able to capture an image of at least a substantial portion of the XYZ Bank 105 such that the XYZ Bank 105 is in the center of the viewing angle 109. FIGS. 1B and 1C illustrate examples of image frames 110 and 120 captured by the computing device 103 in accordance with various embodiments. As illustrated in FIG. 1B, an image frame 110 of the XYC Bank 105 and the ABC Restaurant 106 can be presented on the computing device 103. Text and features of the image frame 110 may be analyzed according to various imaging processing algorithms and recognition techniques discussed herein. The image frame 110 may be selected as a reference frame to be compared with incoming image frames. As illustrated in FIG. 1C, when the user 101 moves along the street from the position 107 to the position 108, a different image frame 120 can be presented on the computing device 103.

Many embodiments determine a difference between the reference frame 110 and the incoming frame 120. The difference can be determined in some embodiments by determining corresponding feature locations in the frames and determining an average amount and/or direction of movement of those feature locations between frames. If the difference between the reference frame 110 and the incoming frame 120 does not meet one or more difference criteria, a user interface or at least one processor of the computing device 103 is notified to reduce processing of incoming data over time. If the difference between the reference frame 110 and the incoming frame 120 meets the one or more difference criteria, then a scene-change event may be determined. A notification is then sent to the user interface or the at least one processor of the computing device 103. Incoming data to the computing device 103 can be treated as new and processed as those under an active condition. The incoming frame 120 can be selected as a new reference frame for detection of next scene-change-event.

In some embodiments, a difference between frames can be determined by using one or more homography algorithms. One of the difference criteria may be a percentage of differences comparing the incoming frame 120 and the reference frame 110. For example, a motion threshold may be a predefined percentage in length determined horizontally, vertically or both. In some embodiments, a difference could be measured based upon a percentage of features (e.g., 90 percentage) in the reference frame 110 that are no longer present in the incoming frame 120. In some instances, one of the difference criteria may require all features in the reference frame 110 which are no longer in the incoming frame 120. In some embodiments, downsampled image frames may be used in tracking a difference between frames to achieve computational efficiency.

The computing device 103 may have moved relatively to objects in a scene represented in an incoming frame. In some instances, the captured scene may be dynamic while the computing device is relatively static. In some other instances, the computing device may be moving while capturing the scene, which itself may or may not be static. In some embodiments, if the computing device 100 is determined to not be able to currently identify objects in a scene, incoming frames may be skipped until the computing device 100 is stabilized on a scene for at least a predefined period of time. In some embodiments, features or objects in the reference frame 110 may be rotated or obscured in the incoming frame 110. Reflections and other light effects may also cause the scene in the incoming frame 110 to change significantly. If a difference between the reference frame 110 and the incoming frame 120 cannot be calculated by using a homography algorithm or other suitable algorithms, it is then assumed that a scene-change-event has occurred.

Some embodiments perform a sound identification to determine an audio reference (e.g., a song or ambient sound signal) associated with the reference frame 110. Audio data associated with the incoming frame 120 is compared with the audio reference to determine an audio change between the incoming audio data and the audio reference. In some instances, frequency, pattern, and/or volume differences between the audio data associated with the incoming frame 120 and the reference audio data can be analyzed. If the audio change is below an audio threshold, a user interface or one or more processors of the computing device 103 can be notified to reduce processing incoming data over time. If the audio change is above the audio threshold, the user interface or the one or more processors of the computing device 103 can be notified that a scene-change-event has occurred. The incoming frame 120 can be selected as a new reference frame while the audio data associated with the reference frame 110 is selected as a new audio reference.

In some embodiments, at least one orientation, surrounding, and/or position determining sensor on the computing device 103 may be used in determining a scene-change-event. For example, the at least one sensor on the computing device 103 may track motions or surroundings of the computing device 103. A rapid moving computing device, a substantial scale change in a scene, or a substantial change in ambient light and/or surrounding sound may indicate that a scene-change event has occurred and trigger a scene-change-event notification. In some embodiments, the at least one sensor on the computing device 103 may include at least one of accelerometers, inertial sensors, magnetometers, electronic gyroscopes, ambient light sensors, proximity sensors, or electronic compasses.

Some embodiments use sensor data from at least one orientation, surrounding, and/or position determining sensor on the computing device 103 to assist comparison between the reference frame 110 and the incoming frame 120. For example, a gyroscope and/or accelerometer on the computing device 103 may provide information regarding rotation and translation of the computing device 103. Such information may be used for an efficient comparison between frames by allowing for an estimate of where to search for relevant features in an incoming frame.

Figure 2:
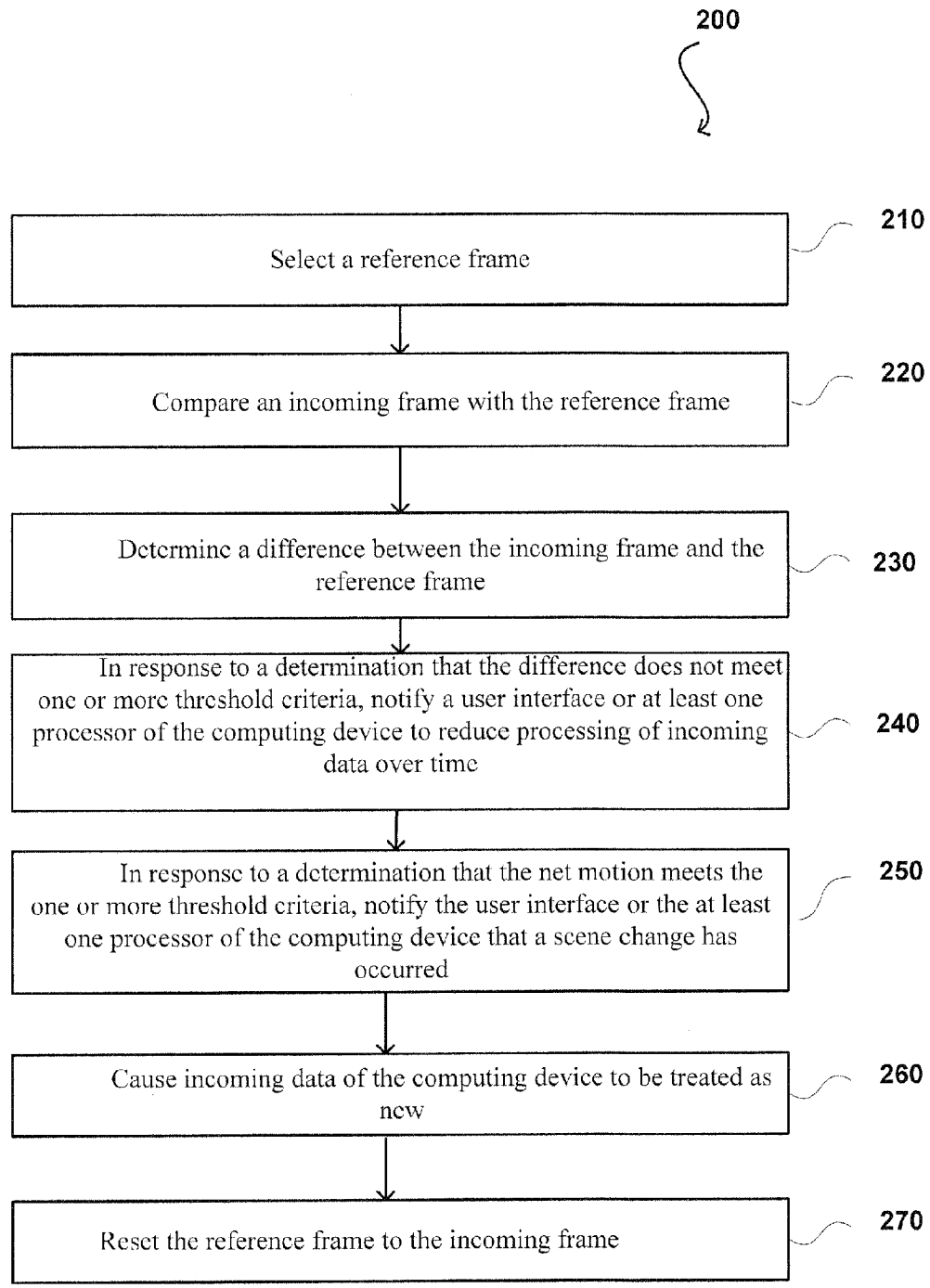
FIG. 2 illustrates an example process for detecting a scene-change-event that can be utilized in accordance with various embodiments.

FIG. 2 illustrates an example process 200 for detecting scene changing event that can be utilized in accordance with various embodiments. It should be understood that there can be additional, fewer, or alternative steps performed in similar or alternative orders, or in parallel, within the scope of the various embodiments unless otherwise stated. Some optional steps are included for illustrative purposes without limiting the scope of the various embodiments discussed herein. The example method embodiment 200 starts with selecting a reference frame, at step 210. In some embodiments, the reference frame is a frame corresponding to a latest scene-change-event. The reference frame can be used to compare with an incoming frame, at step 220. A difference between the incoming frame and the reference frame can be determined based at least upon features or objects in the frames, audio data, or lighting changes between the frames, at step 230. In some embodiments, the difference between the incoming frame and the reference frame is determined by using one or more homography algorithms. The difference could be a percentage of the length of sides of a frame.

In some instances, the difference is a percentage of the incoming frame that is new comparing with the reference frame. In some embodiments, if the computing device is detected to move quickly or back and forth, incoming frames may be skipped until the computing device is determined to be stabilized on a scene for at least a predetermined period of time.

At step 240, in response to a determination that the difference does not meet one or more difference criteria, a user interface or at least one processor of the computing device is notified to reduce processing of incoming data over time. In response to a determination that the difference meets the one or more difference criteria, the user interface or the at least one processor of the computing device is notified that a scene-change-event has occurred, at step 250. In some embodiments, if the difference cannot be calculated by using a homography algorithm, it can be assumed that a scene-change-event has occurred.

In some embodiments, one or more orientation, surrounding, and/or position sensors on a computing device may be used to track motion and/or surroundings of the computing device. A scene-change-event is determined based at least upon data from the one or more sensors. The one or more sensors include at least one of accelerometers, inertial sensors, magnetometers, electronic gyroscopes, ambient light sensors, proximity sensors, or electronic compasses.

In some embodiments, the scene-change-event notification may include the types of texts, features or objects of the incoming frame. One or more processors of the computing device may treat texts and/or features in the incoming frame differently from those in the reference frame. The scene-change-event notification may cause all incoming data to be treated as new and processed as under regular condition, at step 260. The reference frame is then reset to the incoming frame that triggered the scene-change-event notification, at step 270.

Figure 3:
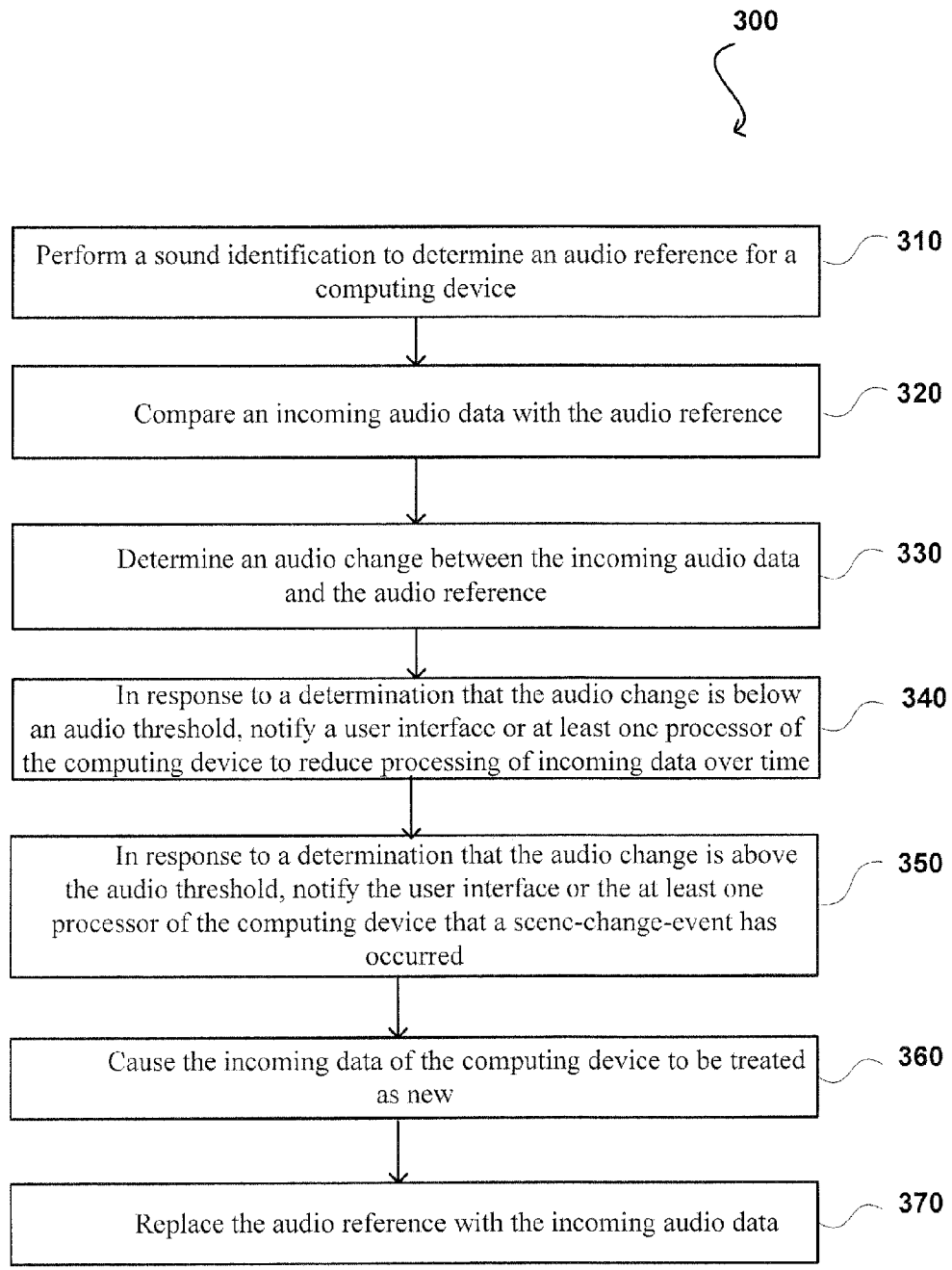
FIG. 3 illustrates another example process for detecting scene-change-event that can be utilized in accordance with various embodiments.

FIG. 3 illustrates another example process 300 for detecting scene changing event that can be utilized in accordance with various embodiments. The example method embodiment 300 starts with performing a sound identification to determine an audio reference for a computing device, at step 310. In some embodiments, the audio reference may be an averaged ambient sound. For example, an omni-directional microphone on the computing device may be used to collect ambient sounds. The audio reference may be an averaged ambient sound over a predetermined period of time.

In some embodiments, one or more directional or bi-directional microphones may be used to identify a user's speech or voices from certain directions. The user's speech or the voices from a certain direction may be identified as an audio reference. In some embodiments, frequencies and patterns of the user's speech or incoming audio data can be analyzed. The frequency distribution, amplitude, and/or periodic rhythm of the incoming audio data may be identified as an audio reference. In some embodiments, diatonic and chromatic scales, and/or harmony of the received audio data are analyzed over a period of time to determine an audio reference. In some embodiments, a particular song or music may be determined and identified an audio reference. In some instances, frequency, harmony, diatonic and/or chromatic signature or progression of popular songs and music may be analyzed offline and provided to the computing device in the process of identifying an audio reference.

At step 320, an incoming audio data can be compared with the audio reference. An audio change between the incoming audio data and the audio reference can be determined based upon an audio difference in at least one of amplitude, frequency, harmony, diatonic scale, or chromatic scale, at step 330. For example, as someone is walking away from the user or the user is turning away from the voice source, the amplitude of the incoming audio data can be decreased. For another example, when a background song changes from one type of music to a different type of music, the frequency, harmony, diatonic scale, and/or chromatic scale of the incoming audio data may be different from those of the audio reference.

At step 340, in response to the audio change is below an audio threshold, a user interface or at least one processor of the computing device can be notified to reduce processing of incoming data over time. In response to the audio change is above the audio threshold, the user interface or the at least one processor of the computing device can be notified that a scene-change event has occurred, at step 350. Various types of notifications may be used to notify the user interface that the computing device is processing incoming data with reduced or normal speed. In some embodiments, a notification of the scene-change event may include the context of the incoming audio data (e.g., a certain type of music) so that the audio data can be processed accordingly. At step 360, the notification of the scene-change event may cause the incoming data to be treated as new. The audio reference is then reset based at least upon the incoming audio data, at step 370.

Figure 4A:
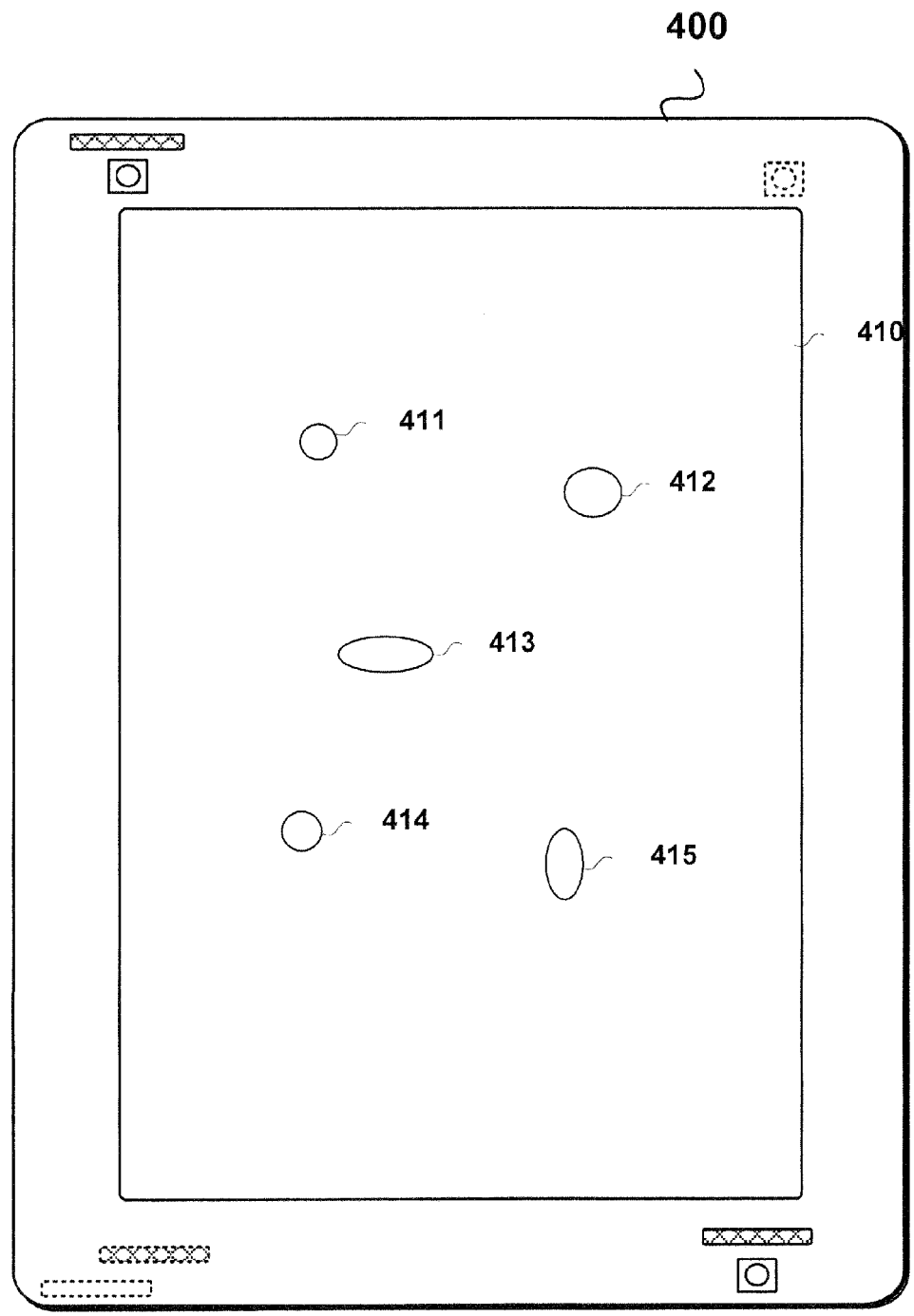
FIG. 4A illustrates an example of a reference frame in accordance with various embodiments.

FIG. 4A illustrates an example of a reference frame 400 with one or more tracking points in accordance with various embodiments. In this example, the reference frame 400 may be a captured image or video and/or be associated with a latest scene-change-event. The reference frame 400 can be analyzed to obtain a set of candidate tracking points. Various embodiments provide imaging processing algorithms and recognition techniques to recognize a set of candidate tracking points in a reference frame and incoming frames. For example, optical character recognition (OCR) can be used as a primary image analysis technique or to enhance other processes. Features (e.g., shape, size, color and text) of an incoming frame can be extracted and matched against texts, features or objects identified in a reference frame. In some embodiments, image processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns). Various techniques (e.g., OCR and other text recognition processes) can be used as the primary image analysis technique or to enhance other processes. Some techniques are described in co-pending U.S. patent application Ser. No. 14/094,655, filed Dec. 2, 2013, entitled "Visual Search in a Controlled Shopping Environment," which are hereby incorporated herein by references in their entirety.

In some embodiments, a tracking point can be obtained by analyzing texts, features, and/or objects in the reference frame 400. In some instances, a confidence score may be calculated for each of the candidate tracking points. The confidence score measures how well a candidate tracking point can be distinguishable from background or other features of the image or video. A candidate tracking point with a low confidence score may indicate that the confidence to correctly locate the candidate tracking point in another image is low. In some embodiments, the captured image or video 410 may be correlated to a latest scene-change-event.

One or more tracking points, 411, 412, 413, 414, and 415, with high confidence scores may be selected from the set of tracking points to be used to compare with features in the incoming frames. Fewer or more tracking points may be obtained and/or selected to optimize the processing capacity and battery life of the computing device 400 in accordance with various embodiments.

In some embodiments, a tracking point may include a portion of regions surrounding a corresponding distinguishable features in the captured video or image 410. Candidate tracking points with surrounding regions may have different sizes and shapes. The confidence score measures how well a candidate tracking point with surrounding regions can be distinguishable from other features of the image or video and/or in a new image frame. In some embodiments, each of the candidate tracking points with a portion of surrounding regions has substantially the same size and shape (e.g., circle or rectangular).

Figure 4B:
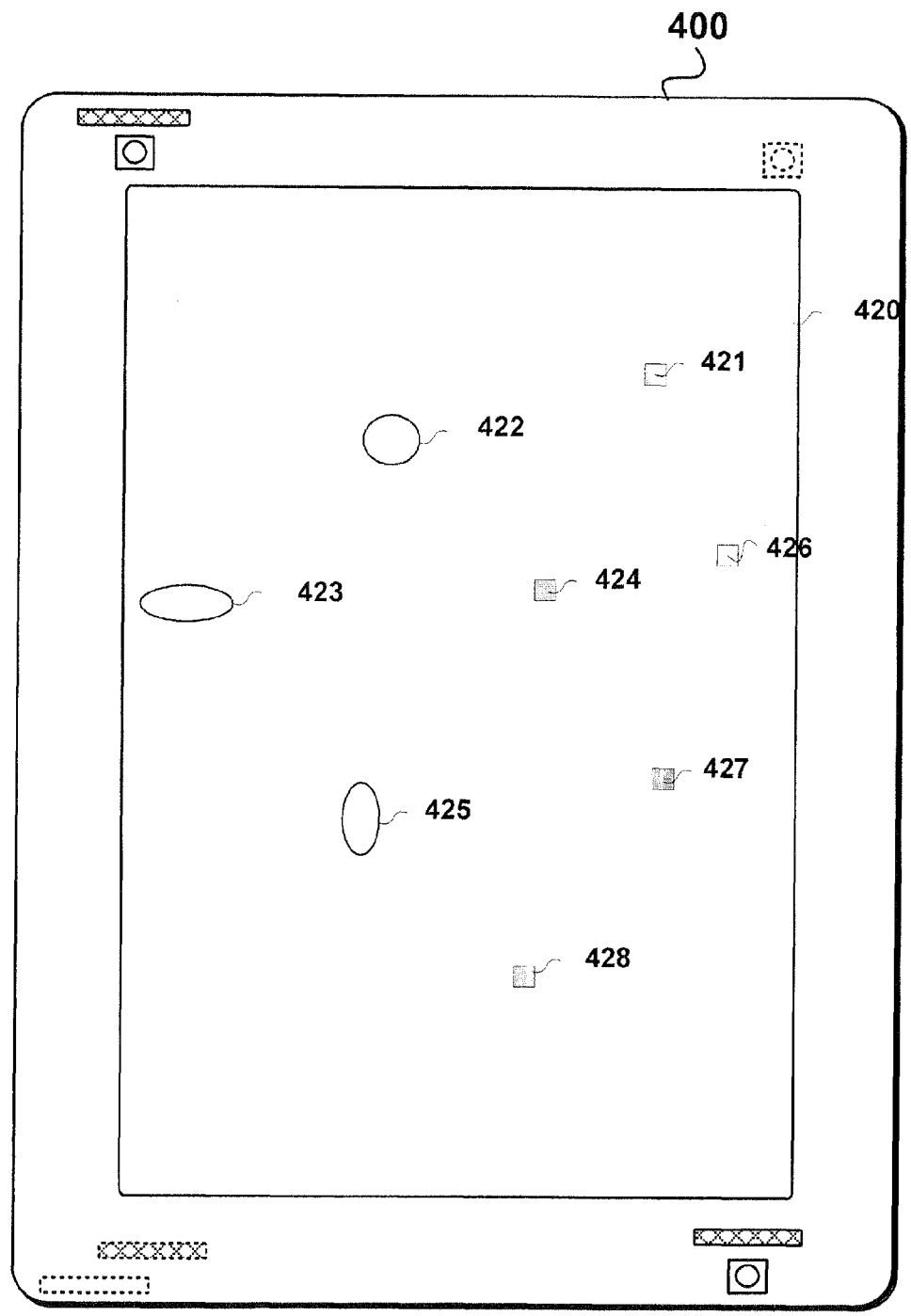
FIGS. 4B, 4C and 4D illustrate examples of motion changes between frames in accordance with various embodiments.
Figure 4C:
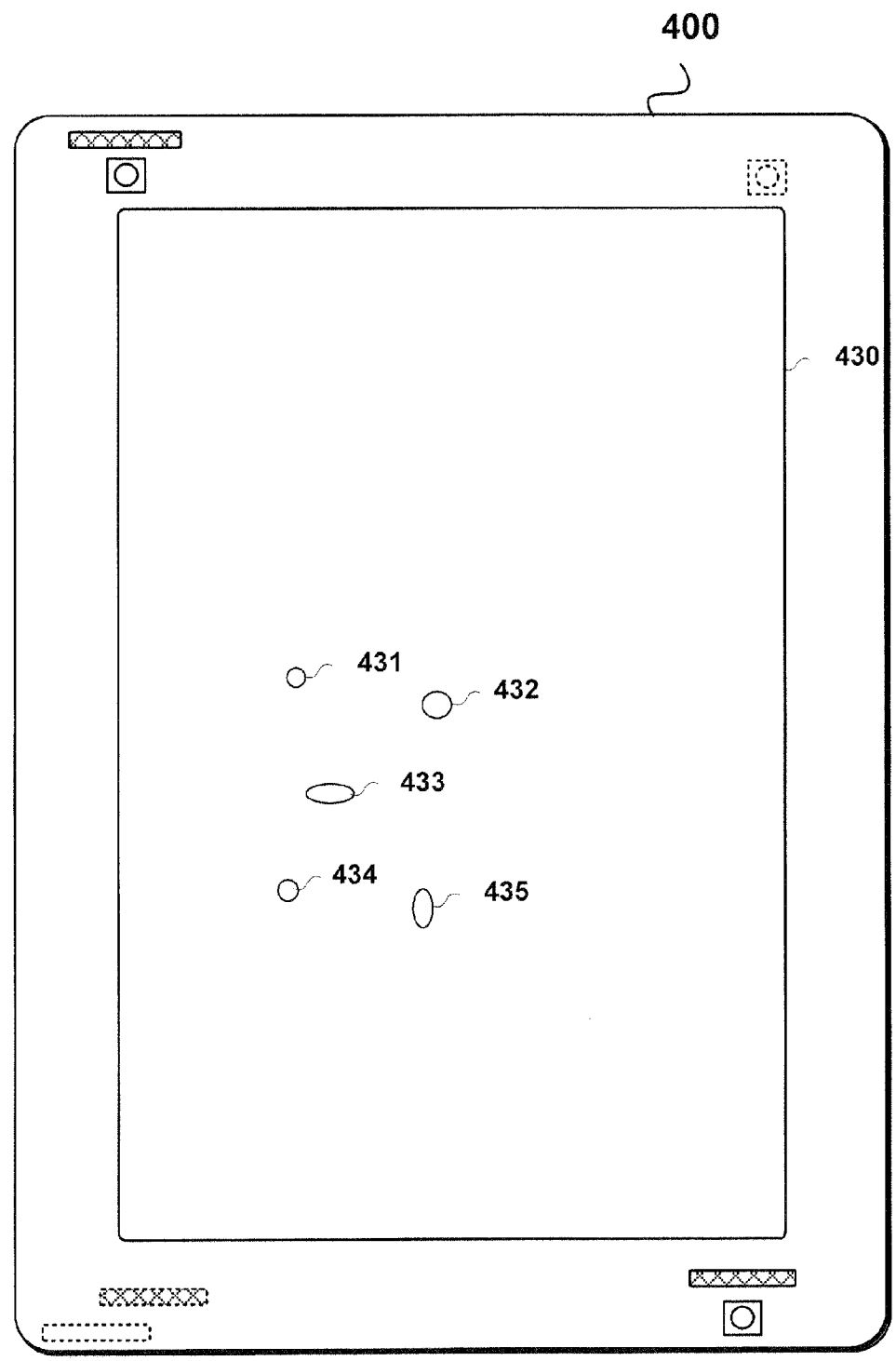
Figure 4D:
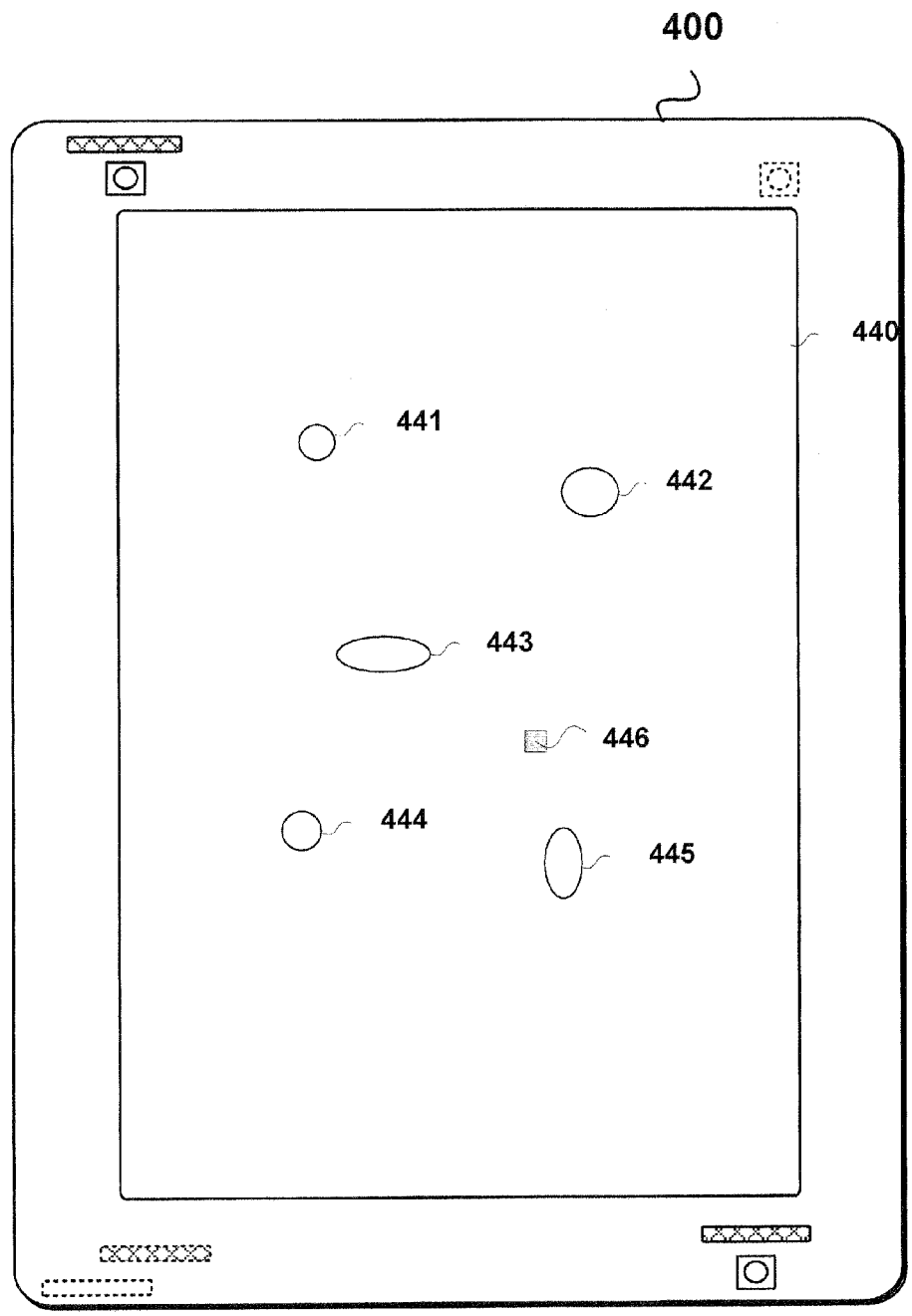

FIGS. 4B, 4C and 4D illustrate examples of motion changes between frames in accordance with various embodiments. In FIG. 4B, a captured scene of an incoming frame 420 is dynamic while the computing device 400 is relatively static. Comparing with the reference frame 410 in FIG. 4A, some of the selected tracking points in the reference frame 410 may be no longer present in the incoming frame 420. In this example, tracking points 422, 423, and 425 matched to the reference frame 410 are still present while tracking points 421, 424, 428, 426, and 427 are new tracking points in the field of view. A net motion of these selected tracking points 422, 423, and 425 between the incoming frame 420 and the reference frame 410 can be compared with a motion threshold to determine whether a scene-change-event has occurred.

In some embodiments, a motion threshold may be a percentage (e.g., 80 percent) of tracking points in the reference frame 410 that is no longer in the incoming frame 420. In some embodiments, a motion threshold may require all tracking points in the reference frame which are no longer in an incoming frame. For example, a notification of scene-change-event can be triggered only when none of the selected tracking points or features in the reference frame 410 is present in an incoming frame 420.

In FIG. 4C, the computing device 400 is moving while a captured scene of an incoming frame 430 is relatively stable. In this example, the computing device 400 is moving away from the captured scene. All selected tracking points, 431, 432, 433, 434, and 435, in the reference frame 410 are still present in the incoming frame 430. A scale change (e.g, the computing device 400 is moving closer or farther away from the captured scene in the incoming frame 430) between the incoming frame 430 and the reference frame 410 can be determined. In some embodiments, in response to a determination that a substantial scale change has occurred, a scene-change-event notification can be sent to at least one processor of the computing device 400 to resume processing incoming data under an active condition. Incoming data can be treated as new and processed as those under an active condition. The incoming frame 430 is then treated as a new reference frame for future comparisons.

In FIG. 4D, the computing device 400 and a captured scene of an incoming frame 440 are relatively stable. Comparing with the reference frame 410 in FIG. 4A, the selected tracking points in the reference frame 410 are still present in the incoming frame 440. In this example, all tracking points 441, 442, 443, 444, and 445 matched to the reference frame 410 are present while a new tracking point 446 (e.g., an object or feature, such as a bird or bus) is brought in the field of view of the computing device 400. The new tracking point 446 can be used to determine whether or not a scene-change-event has occurred.

Figure 5A:
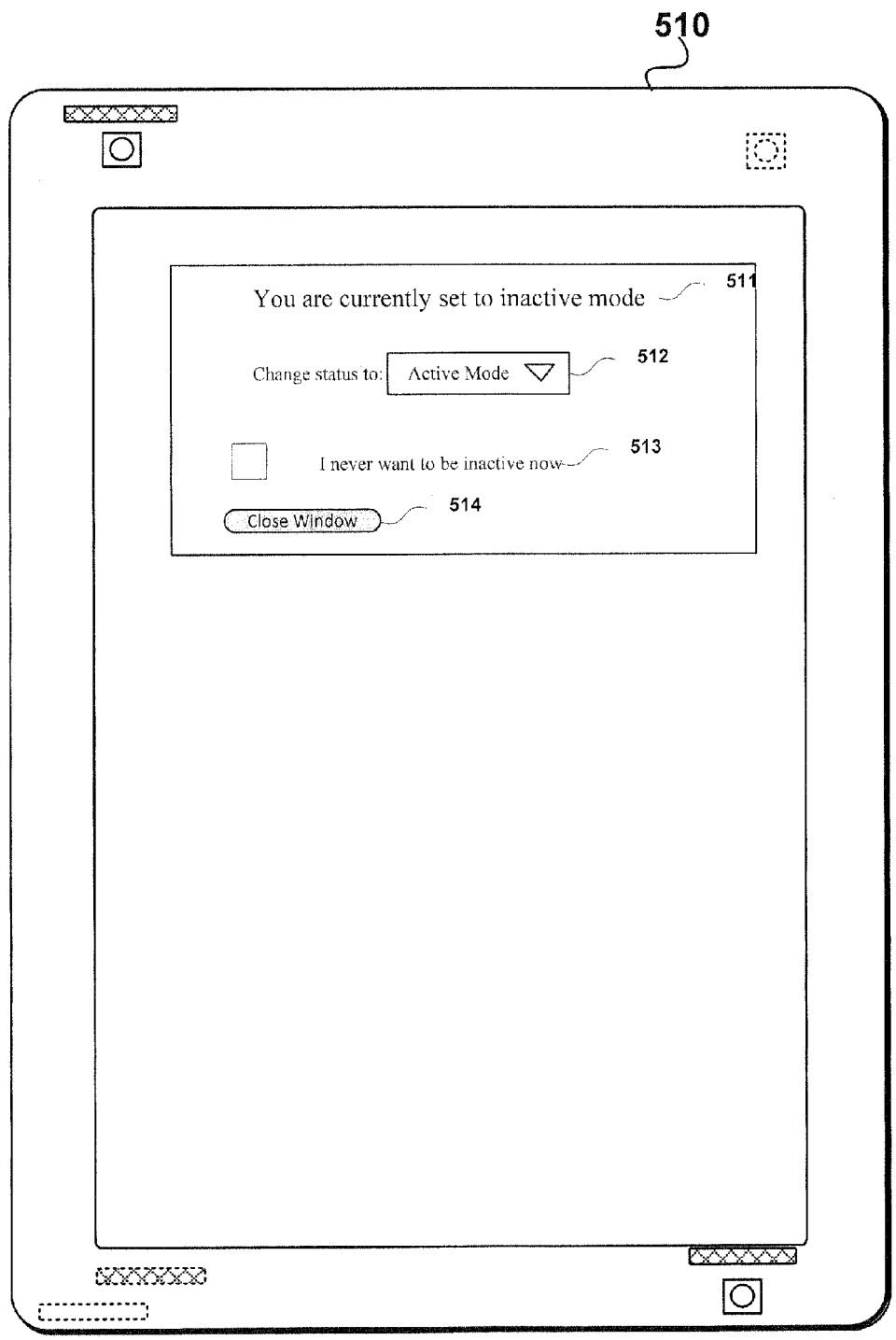
FIGS. 5A and 5B illustrate examples of notifications on a user interface in accordance with various embodiments.
Figure 5B:
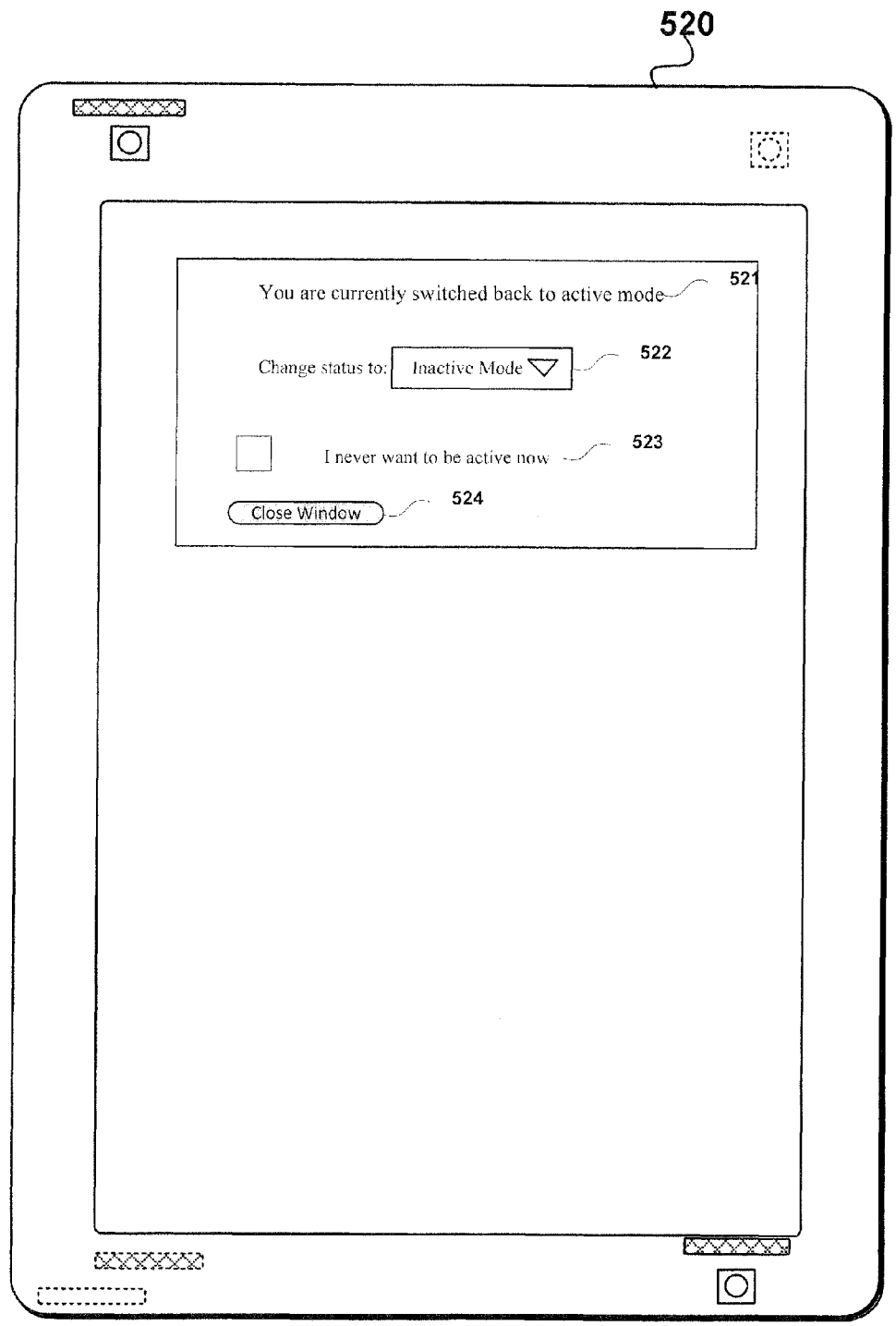

Various embodiments provide notifications on a user interface of a computing device when a detected scene is unchanging over time or a new scene is detected. FIGS. 5A and 5B illustrate examples of notifications on a user interface of a computing device 510 in accordance with various embodiments. Notifications on a user interface may provide a quick and simple way to notify a user of the computing device 510 that the device's status has been changed or reset. For example, as illustrated in FIG. 5A, if a user of the computing device 510 has aimed the device 510 at the same scene with no new features or objects detected over a period of time, the user may be notified. In this example, the notification includes a message that the status of the computing device has changed to inactive, "You are currently set to inactive mode" 511. The user may be provided options to "Change status to Active Mode" 512, set the status to "I never want to be inactive now" 513, or choose to "Close Window" 514.

For another example, as illustrated in FIG. 5B, in response to a determination that a scene-change event has occurred, a notification of the scene-change-event may be displayed on a user interface of the computing device 520. In this example, the notification indicates that the status of the computing device 520 has been switched to active mode, "You are currently switched back to active mode" 521. The user may change the status back to "Inactive Mode" 522, set the status to "I never want to be active now" 523, or choose to "Close Window" 524.

Depending on the user's selection, the notification may also be used to inform one or more processors of the computing device that the processing status of incoming data has been changed. In some embodiments, the notification to the one or more processors may include context of the incoming frame or data. For example, comparing with a book cover in the reference frame, the incoming frame may have changed to a newspaper. The notification of the scene-change-event may include the context of the newspaper. The one or more processors may treat text in the newspaper differently from text in the book cover.

In some embodiments, scene-change-events may be used to determine the status of a user. For example, based upon the length of a user having been on a particular scene, a determination can be made that the user may have difficulty in accomplishing a task. Specific guidance may be provided on a display of a user device based at least upon the determination. For another example, in response to constantly changing scenes being detected, a determination may be made that a user is not trying to actively identify a scene or object.

Some embodiments enable a user to utilize scene-change-events for presentation and/or historical review purposes. Options may be provided to the user to customize presentation and/or historical review of incoming frames within a scene by grouping together one or more identified features or objects from the incoming frames as the frames within the scene are aggregated. For example, a user device is pointed at a poster (i.e., a scene) that contains a quick response (QR) code, a phone number, a uniform resource locator (URL), and a picture of a book. These four identified features or objects can be grouped together when their corresponding frames are aggregated by the same scene. In some embodiments, options can be provided to a user to customize historical review. For example, the historical review may be customized based at least upon identified scene-changeevents, geo-location of a user device, or identification types (e.g., phone numbers, barcodes, product categories, or any suitable identification determined by the user).

Figure 6:
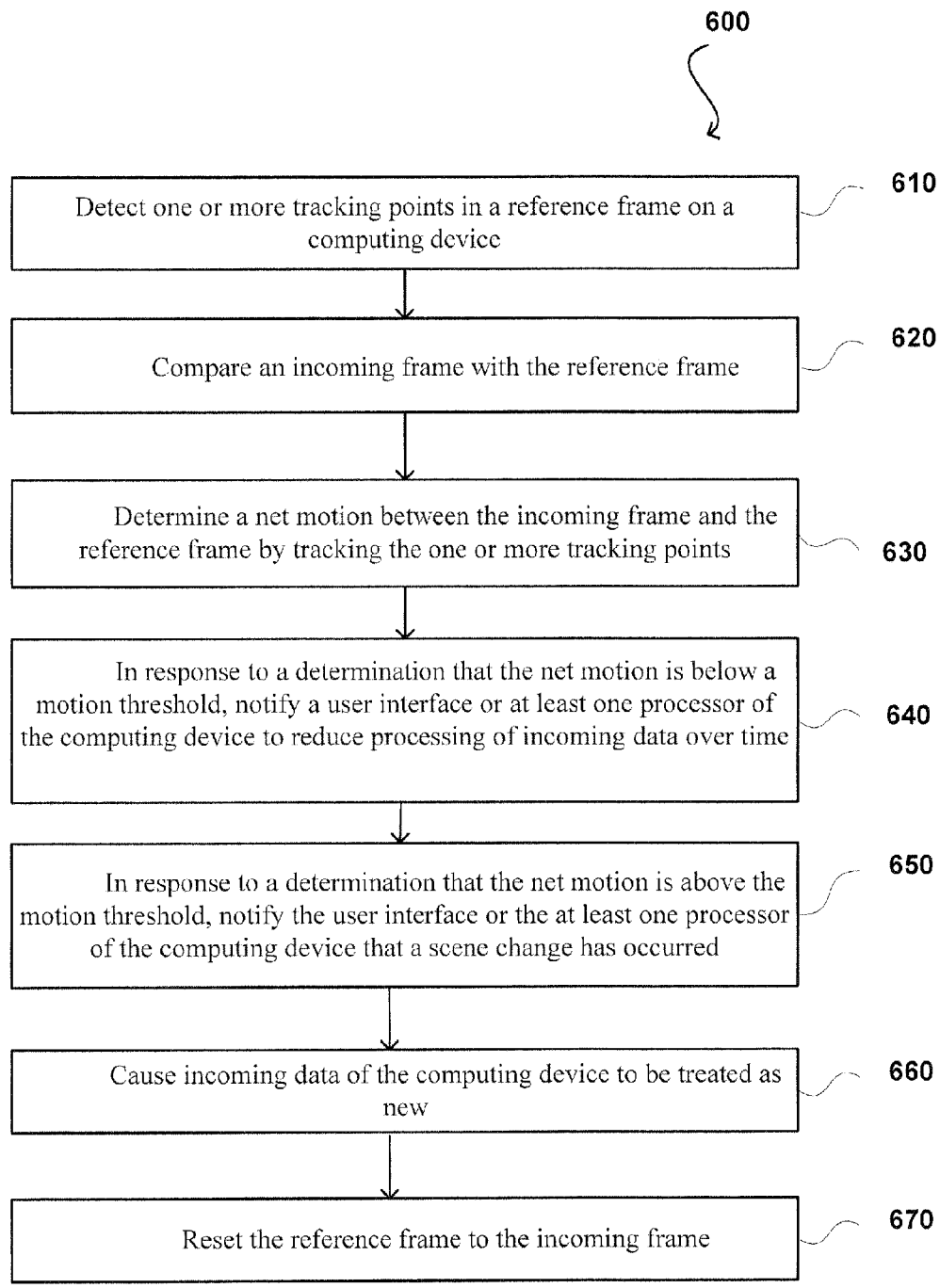
FIG. 6 illustrates yet another example process for detecting a scene-change-event that can be utilized in accordance with various embodiments.

FIG. 6 illustrates yet another example process 600 for detecting scene-changing-event that can be utilized in accordance with various embodiments. The example method embodiment 600 starts with detecting a set of candidate tracking points in a reference frame captured by a computing device, at step 610. In some embodiments, text, features, and/or objects in the reference frame may be detected and analyzed to determine a set of candidate tracking points. A confidence score can be calculated for each of the candidate tracking points. In some embodiments, each tracking point may include a portion of regions surrounding the corresponding text, feature or object in the reference frame. One or more tracking points with the highest confidence score may be selected to be used to compare with incoming frames.

The reference frame is compared with an incoming frame, at step 620. A net motion between the reference frame and an incoming frame can be determined by tracking the one or more selected tracking points, at step 630. In response to a determination that the net motion of the one or more tracking points is below a motion threshold, a user interface or at least one processor of the computing device can be notified to reduce processing of incoming data over time, at step 640. In response to a determination that the net motion of the one or more tracking points is equal to or above the motion threshold, the user interface or the at least one processor of the computing device can be notified that a scene-change-event has occurred, at step 650.

In some embodiments, the scene-change-event notification may include the types of text, features or objects of the incoming frame. The scene-change-event notification may cause all incoming data to be treated as new and processed as under regular condition, at step 660. The reference frame is then reset to the incoming frame that triggered the scene-change-event notification, at step 670.

Various other types of methods to detect scene-change-event on a computing device may also be possible, some of which are discussed in further detail elsewhere herein.

Figure 7:
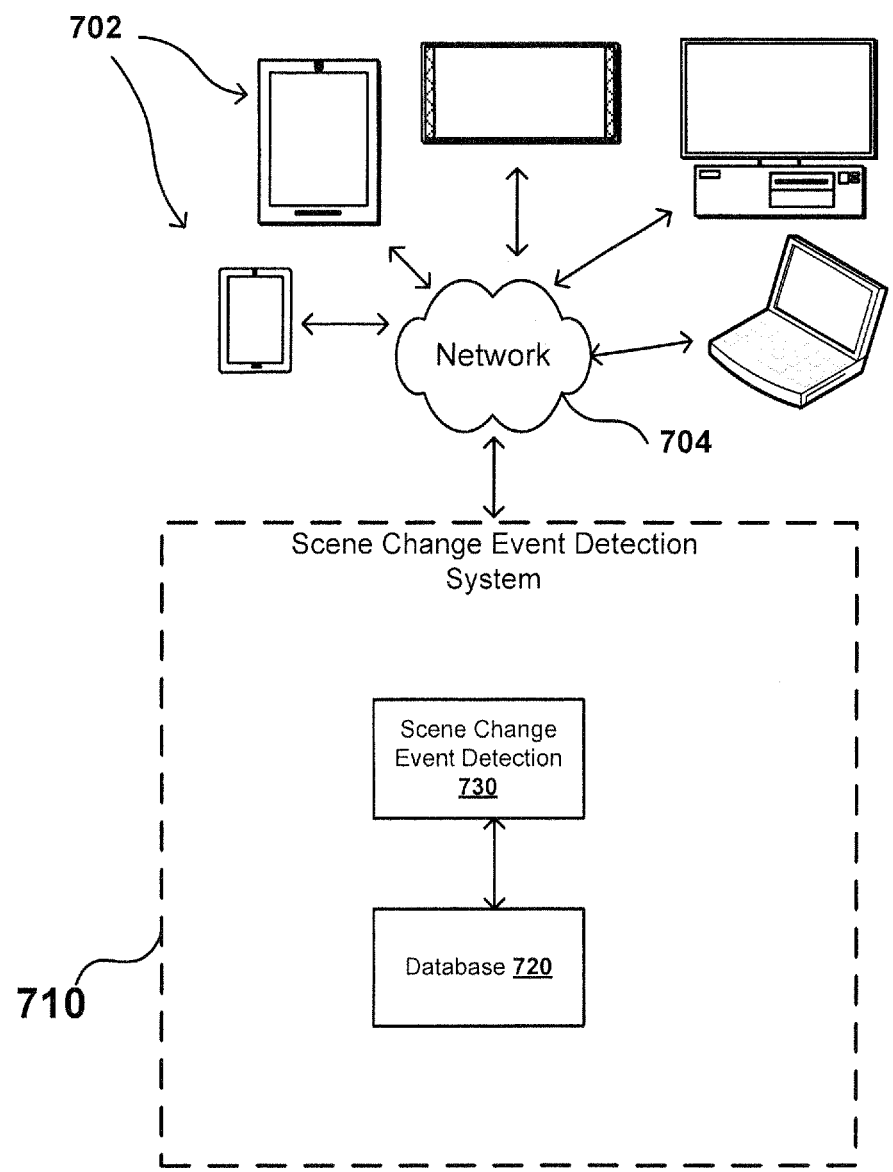
FIG. 7 illustrates an example of a scene-change-event detection system for detecting scene change events in accordance with various embodiments.

FIG. 7 illustrates an example of a scene-change-event detection system 710 for detecting scene change events in accordance with various embodiments. In this example, the scene-change-event detection system 710 includes a scene-change-event detection module 730 and a database 720. The scene-change-event detection system 710 communicates with client computing devices 502 via a network 704. Although only some client computing devices 702 are shown in FIG. 7, it should be understood that various other types of electronic or computing devices that are capable of receiving, or rendering a Web application in accordance with various embodiments are discussed herein. These client devices can include, for example desktop PCs, digital cameras, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these.

In some embodiments, the scene-change-event detection system 710 provides a web service allowing a computing device to reduce processing incoming data over time, and, in response to detecting a scene change event, notify one or more data processors that a scene-change-event has occurred. The client computing devices 702 can capture or display images or videos on a display screen or a camera preview screen. An incoming frame can be compared with a reference frame to determine a difference between the reference frame and the incoming frame. The reference frame may be corresponding to a latest scene-change-event. In some embodiments, the comparison between an incoming frame and the reference frame is performed on the client computing devices 702. In some embodiments, the comparison between an incoming frame and the reference frame can be off-loaded to a cloud computing service or the scene-change-event detection system 710. If the difference is does not meet one or more difference criteria, a user interface or at least one processor of the computing device is notified to reduce processing of incoming data over time. On the other hand, if the difference meets the one or more difference criteria, the user interface can be notified that a scene-change-event has occurred. Current incoming data to the computing device can be treated as new and processed as those under an active condition. In response to the scene-change-event notification, the reference frame is reset to the current incoming frame.

In some embodiments, an audio reference (e.g., a song or ambient sound signal) can be determined for the client computing devices 702. The audio reference may be an averaged ambient sound collected by an omni-directional microphone of the client computing devices 702 over a predetermined period of time. In some embodiments, frequencies and patterns of the user's speech or received audio data may be analyzed. The frequency distribution, amplitude, and/or periodic rhythm of audio data in a latest scene-change-event may be identified as an audio reference. In some embodiments, diatonic and chromatic scales, and/or harmony of the received audio data may be analyzed to determine an audio reference. In some instances, frequency, harmony, diatonic and/or chromatic signature or progression of popular songs and music may be analyzed offline or by the scene-change-event detection system 710. The analyzed frequency, harmony, diatonic and/or chromatic signature or progression of popular songs and music may be provided to the client computing devices 702 or stored in a database 720.

In some embodiments, an incoming audio data is compared with the audio reference to determine an audio change between the incoming audio data and the audio reference. If the audio change is below an audio threshold, a user interface or one or more processors of the computing device can be notified to reduce processing incoming data over time. If the audio change is above the audio threshold, the user interface can be notified that a scene-change-event has occurred. Incoming data can be processed and treated as new data under an active condition. In response to the scene-change-event notification, the audio reference can be reset to the incoming audio signal.

In some embodiments, one or more sensors (e.g., accelerometers, inertial sensors, magnetometers, electronic gyroscopes, ambient light sensors, proximity sensors, or electronic compasses) of the client computing devices 702 may be used to track motion and/or surroundings of the computing device. A scene-change-event is determined based at least upon the tracked changes in the motion or surroundings of the computing device.

Figures 8A, 8B:
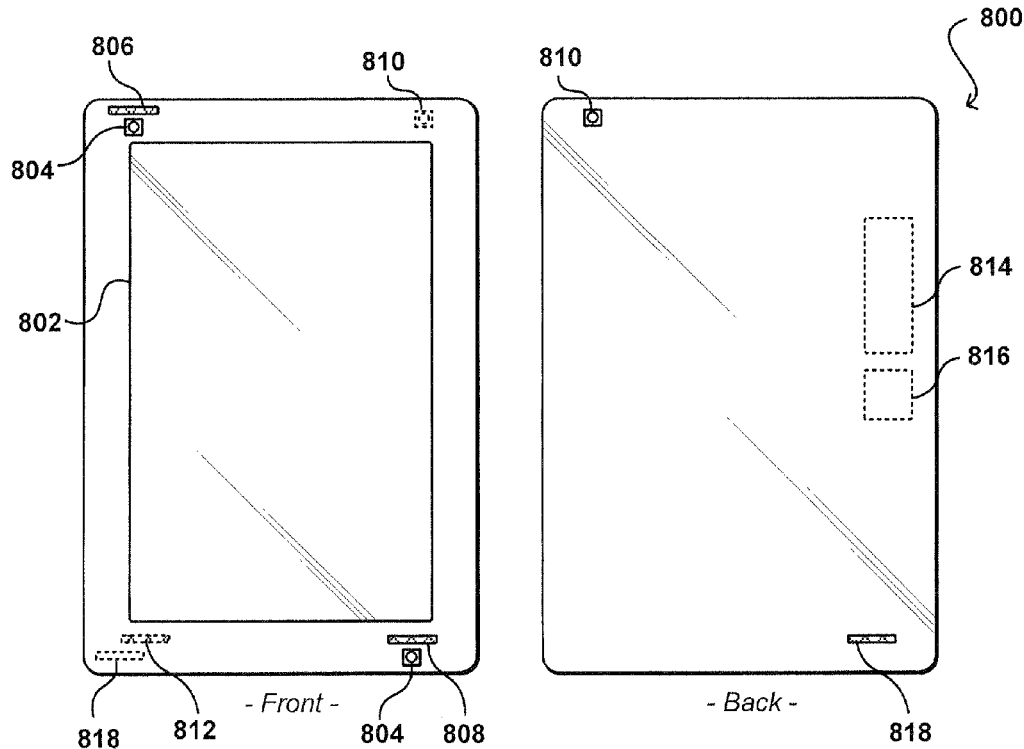
FIGS. 8A and 8B illustrates an example computing device that can be used to implement aspects of the various embodiments.

FIGS. 8A and 8B illustrate front and back views, respectively, of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices are capable of receiving, displaying or playing streaming media files in accordance with various embodiments discussed herein. The devices can include, for example, desktop PCs, laptop computers, tablet computers, personal data assistants (PDAs), smart phones, portable media players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, among others.

In this example, the computing device 800 has a display screen 802 (e.g., an LCD element) operable to display information or image content to one or more users or viewers of the device. The display screen of some embodiments displays information (e.g., streaming media file) to the viewer facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one computing mechanism 814, and may include at least one wired or wireless component operable to communicate with one or more electronic devices. The device also includes a power system 816, and may include a battery operable to be recharged through al plug-in approaches, or through other approaches such as capacitive charging through proximity with a power mat or other such device. Various other elements and/or combinations are possible as well within the scope of various embodiments.

Figure 9:
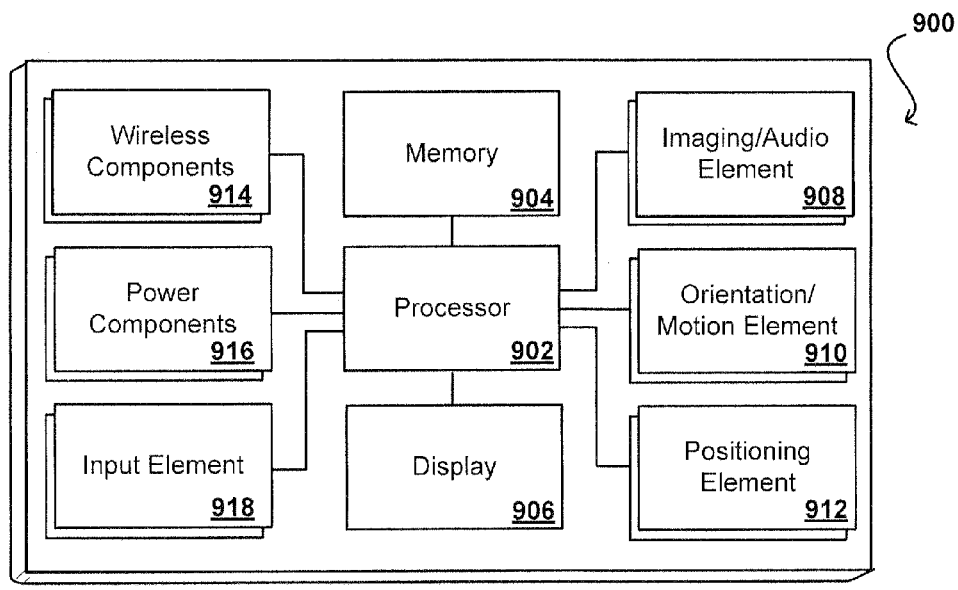
FIG. 9 illustrates example components of a computing device such as that illustrated in FIGS. 8A and 8B, in accordance with various embodiments.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of computing approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers. The display element 906 is capable of displaying streaming media files or other information to viewers facing the display element 906.

As discussed, the device in many embodiments will include at least one imaging/audio element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation/motion determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device. In some embodiments, the example computing device 900 may also include a low power, low resolution imaging element to capture image data. The low resolution imaging element can transmit the captured image data over a low bandwidth bus, such as an I2C bus, to a low power processor, such as a PIC-class processor. The PIC processor may also communicate with other components of the computing device 900, such as Orientation Motion Element 910, etc. The PIC processor can analyze the image data from the low resolution imaging element and other components of the computing device 900 to determine whether the head motion likely corresponds to a recognized head gesture. If the PIC processor determines that the head motion likely corresponds to a recognize head gesture, the PIC processor can enable other image element to activate high resolution image capture and/or main processor to analyze the capture high resolution image data.

The example device also includes one or more wireless components 914 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more al wired communications connections as known in the art.

The device also includes a power system 916, such as may include a battery operable to be recharged through al plug-in approaches, or through other approaches such as capacitive charging through proximity with a power mat or other such device. Various other elements and/or combinations are possible as well within the scope of various embodiments.

In some embodiments the device can include at least one additional input device 718 able to receive al input from a user. This al input can include, for example, a push button, touch pad, touch screen, wheel, joystick, keyboard, mouse, keypad, or any other such device or element whereby a user can input a command or a request for additional product information to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 10:
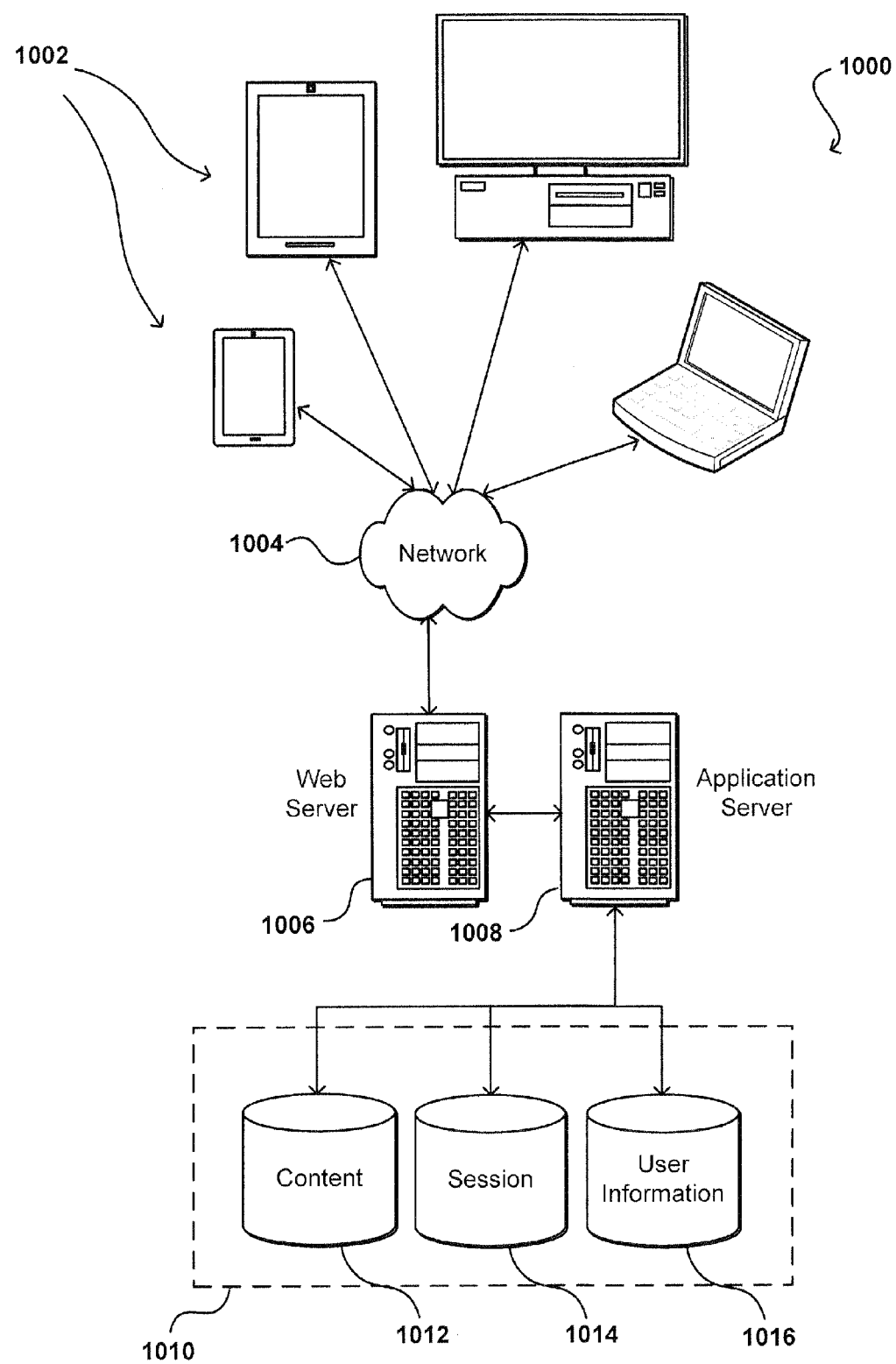
FIG. 10 illustrates an environment in which various embodiments can be implemented in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic computing device 1002, which can include any appropriate device operable to send and receive requests, messages or information over an appropriate network 1004 and convey information back to a user of the device. Examples of such computing devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the computing device. In a "pull" network, one or more of the servers send data to the computing device upon request for the data by the computing device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the computing device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the computing device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The user information 1016 may include user preference, historical data, user demographic data, and audio system of the user devices associated with users. Demographic data of users may include user age, user gender, user educational background, user marital status, user income level, user ethnicity, user postal code, user primary language, or user spending habit. The audio system may include headphone (e.g., earphone, ear bud, and the like), speaker (e.g., tablet speaker, blue tooth speaker, computer speaker, bookshelf speaker, center-channel speaker, floor speaker, in-wall and in-ceiling speaker, outdoor speaker, sound bar, portable speaker, and woofer/sub-woofer speaker), or various types of audio amplifiers. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or computing devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as, but not limited to, volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a camera;
   at least one processor; and
   memory including instructions that, when executed by the at least one processor, cause the computing device to:
   acquire a series of frames of content using the camera;
   select a reference frame from the series of frames of content;
   acquire a subsequent frame of content using the camera;
   determine a first feature point that is included in a set of feature points represented in the reference frame;
   determine a first location associated with the first feature point represented in the reference frame;
   determine a second location associated with the first feature point represented in the subsequent frame;
   determine a change between the first location and the second location;
   determine that the change is below a motion threshold; and
   cause the at least one processor to reduce processing of incoming frames of content.

2. The computing device of claim 1, wherein the instructions when executed further cause the computing device to:
   calculate the change using one or more homography algorithms.

3. The computing device of claim 1, wherein the instructions when executed further cause the computing device to:
   determine that no object in the subsequent frame is identified by the computing device; and
   skip the incoming frames of content until the computing device is stabilized on a scene for at least a predefined period of time.

4. The computing device of claim 1, wherein the instructions when executed further cause the computing device to:
   track movement of the computing device by analyzing data from at least one sensor of the computing device; and
   determine whether a scene-change-event has occurred based at least upon the movement of the computing device.

5. A computer-implemented method, comprising: under the control of a computer system configured with executable instructions,
   selecting a reference frame from a series of frames of content;
   acquiring an incoming frame of content using the computer system;
   determining a first feature point that is included in a set of feature points represented in the reference frame;
   determining a first location associated with the first feature point represented in the reference frame;
   determining a second location associated with the first feature point represented in the incoming frame;
   determining a difference between the first location and the second location;
   determining that the difference does not meet one or more difference criteria; and
   causing at least one processor of the computing system to reduce processing of incoming frames of content.

6. The computer-implemented method of claim 5, further comprising:
   determining that the difference meets the one or more difference criteria, indicating that a scene change event has occurred;
   selecting the incoming frame as a new reference frame; and
   processing the incoming frame using an amount of processing capacity under an active condition.

7. The computer-implemented method of claim 6, wherein the indicating includes a type of texts, features or objects of the incoming frame.

8. The computer-implemented method of claim 7, wherein the difference is determined by measuring a percentage of a length of sides of the incoming frame with respect to the reference frame.

9. The computer-implemented method of claim 5, further comprising:
   performing a sound identification to determine an audio reference for the computer system;
   comparing an incoming audio data with the audio reference;
   determining an audio change between the incoming audio data and the audio reference;
   determining that the audio change is below an audio threshold; and
   causing the at least one processor to reduce processing of the incoming frames of content.

10. The computer-implemented method of claim 9, wherein the audio change is determined by analyzing at least frequency, pattern, or volume differences between the incoming audio data and the reference audio.

11. The computer-implemented method of claim 9, wherein the performing the sound identification includes analyzing diatonic and chromatic scales, frequency, or harmony of audio data to the computer system.

12. The computer-implemented method of claim 5, further comprising:
displaying a status of the at least one processor of the computing system on a user interface of the computer system.

13. The computer-implemented method of claim 5, further comprising:
tracking movement of the computer system by analyzing data from at least one sensor of the computer system or network connection data of the computer system; and
determining whether a scene-change-event has occurred based at least upon the movement of the computer system, or the network connection data.

14. The computer-implemented method of claim 13 wherein the at least one sensor of the computer system includes at least one of accelerometers, inertial sensors, magnetometers, electronic gyroscopes, ambient light sensors, proximity sensors, or electronic compasses.

15. The computer-implemented method of claim 5, further comprising:
determining that no object in the incoming frame is identified by the computer system; and
skipping the incoming frames of content until the computer system is stabilized on a scene for at least a predefined period of time.

16. The computer-implemented method of claim 5, further comprising:
down-sampling subsequent incoming frames in determining subsequent differences between the subsequent incoming frames and the reference frame until a scene-change-event is detected.

17. A non-transitory computer-readable storage medium including instructions that, when executed by at least one processor of a computing system, cause the computing system to:
select a reference frame from a series of frames of content;
acquire an incoming frame of content using the computer system;
determine a first feature point that is included in a set of feature points represented in the reference frame;
determine a first location associated with the first feature point represented in the reference frame;
determine a second location associated with the first feature point represented in the incoming frame;
determine a difference between the first location and the second location;
determine that the difference does not meet one or more difference criteria; and
cause the at least one processor to reduce processing of incoming frames of content.

18. The non-transitory computer-readable storage medium of claim 17, wherein the instructions when executed further cause the system to:
determine that the difference meets the one or more difference criteria, indicating that a scene-change-event has occurred;
select the incoming frame as a new reference frame; and
processing the incoming frame using an amount of processing capacity under an active condition.

19. The non-transitory computer-readable storage medium of claim 17, wherein the instructions when executed further cause the system to:
perform a sound identification to determine an audio reference for the computer system;
compare an incoming audio data with the audio reference;
determine an audio change between the incoming audio data and the audio reference;
determine that the audio change is below an audio threshold; and
cause the at least one processor to reduce processing of the incoming frames of content.

20. The non-transitory computer-readable storage medium of claim 17, wherein the instructions when executed further cause the system to:
track movement of the computer system by analyzing data from at least one sensor of the computer system or network connection data of the computing system; and
determine whether a scene-change-event has occurred based at least upon the movement of the computer system, or the network connection data.

21. The non-transitory computer-readable storage medium of claim 17, wherein the instructions when executed further cause the system to:
aggregate the incoming frames that are determined within a scene; and
provide an option for a user of the computing system to customize historical review of the incoming frames within the scene by grouping together one or more identified features or objects from the incoming frames.

* * * * *